US006881921B2

(12) United States Patent
Horner-Richardson et al.

(10) Patent No.: US 6,881,921 B2
(45) Date of Patent: Apr. 19, 2005

(54) TORCH WITH ROTATIONAL START

(75) Inventors: Kevin D. Horner-Richardson, Cornish, NH (US); Pearl A. Grant, Grantham, NH (US); Roger W. Hewett, Plainfield, NH (US); Gene V. Hewes, Plainfield, NH (US); Howard H. Horn, Wilmot, NH (US)

(73) Assignee: Thermal Dynamics Corporation, West Lebanon, NH (US)

( * ) Notice: Subject to any disclaimer, the term of this patent is extended or adjusted under 35 U.S.C. 154(b) by 0 days.

(21) Appl. No.: 10/443,443

(22) Filed: May 22, 2003

(65) Prior Publication Data

US 2004/0232118 A1 Nov. 25, 2004

(Under 37 CFR 1.47)

(51) Int. Cl.[7] .................................................. B23K 10/00

(52) U.S. Cl. ............................. 219/121.48; 219/121.52

(58) Field of Search ......................... 219/121.48, 121.5, 219/121.52, 121.57, 121.49

(56) References Cited

U.S. PATENT DOCUMENTS

| | | | | | |
|---|---|---|---|---|---|
| 4,902,871 | A | * | 2/1990 | Sanders et al. | 219/121.49 |
| 5,874,707 | A | * | 2/1999 | Iida et al. | 219/121.48 |
| 5,961,855 | A | * | 10/1999 | Hewett et al. | 219/121.39 |
| 6,096,993 | A | * | 8/2000 | Marhic et al. | 219/121.5 |
| 6,163,008 | A | * | 12/2000 | Roberts et al. | 219/121.48 |
| 6,472,631 | B1 | * | 10/2002 | Eickhoff et al. | 219/121.48 |

* cited by examiner

*Primary Examiner*—Teresa J. Walberg
(74) *Attorney, Agent, or Firm*—Harness, Dickey & Pierce, P.L.C.

(57) ABSTRACT

A plasma arc torch has a threadless electrode-cathode locking assembly, a one-piece tip assembly, and a rotational contact starting mechanism. The cathode and electrode of the locking assembly are configured such that relative rotation of the electrode with respect to the cathode causes the electrode to move in an axial direction relative to the cathode for locking the electrode in fixed axial and rotational position with respect to the cathode. The inner wall of the one-piece tip assembly is configured to receive the forward end of the electrode in a non-contact position. Rotation of the electrode with respect to the tip causes an arcing formation on the electrode to contact an arcing chamber within the cavity. Rotation of the electrode away from the tip generates a pilot arc in the arcing chamber.

21 Claims, 15 Drawing Sheets

TORCH WITH ROTATIONAL START

FIELD OF INVENTION

The present invention relates generally to plasma arc torches and, in particular, to plasma arc torches having a threadless electrode-cathode locking assembly, a one-piece tip assembly with flow passaging sized to provide a selected ratio of plasma gas flow volume to secondary gas flow volume and a rotational contact starting mechanism.

BACKGROUND OF THE INVENTION

Plasma torches, also known as electric arc torches, are commonly used for cutting and welding metal workpieces by directing a plasma consisting of ionized gas particles toward the workpiece. In a typical plasma torch, a gas to be ionized is supplied to the front end of the torch and flows past an electrode before exiting through an orifice in the torch tip. The electrode, which is a consumable part, has a relatively negative potential and operates as a cathode. The torch tip is adjacent to the end of the electrode at the front end of the torch and constitutes a relatively positive potential anode. When a sufficiently high voltage is applied to the electrode, an arc is caused to jump the gap between the electrode and the torch tip, thereby heating the gas and causing it to ionize. The ionized gas in the gap is blown out of the torch and appears as a flame that extends externally off the tip. As the torch head or front end is brought down towards the workpiece, the arc jumps or transfers between the electrode and the workpiece because the impedance of the workpiece to ground is lower than the impedance of the torch tip to ground. During this "transferred arc" operation, the workpiece itself serves as the anode.

In a conventional plasma torch, an electrode having external threads engages an internally threaded bore in the cathode body to secure the electrode to the torch head. However, it is expensive to perform a threading operation on consumable items such as electrodes. Furthermore, a threaded electrode is prone to errors in centering the electrode on the axis of the plasma torch. Consequently, there is a need for a less expensive electrode-cathode locking assembly which effectively centers the electrode on the axis of the plasma torch.

A number of conventional torches provide both a plasma (i.e. primary) gas flow volume and a secondary (e.g., cooling) gas flow volume. The ratio of plasma gas flow volume to secondary gas flow volume is adjusted by replacing the tip assembly with a different tip assembly having flow passaging sized to provide the desired ratio. In some existing torches, a first gas supply provides the plasma gas (e.g., nitrogen or oxygen) and a second gas supply provides the secondary gas (e.g., a separate supply of nitrogen or oxygen). Alternatively, a secondary fluid such as water may be provided to cool the tip. In any event, supplying two separate fluids within the same torch increases the cost of manufacturing and operating the torch.

Other conventional torches use the same supply of gas for both plasma gas and secondary gas. However, these torches have a multiple-piece tip assembly construction. Thus, replacing the tip assembly to adjust the ratio of plasma gas flow volume to secondary gas flow volume is cumbersome and time-consuming because it requires the operator to replace a plurality of items.

Existing plasma torches may be found in both "non-contact start" and "contact start" varieties. In non-contact start torches, the tip and electrode are typically maintained at a fixed physical separation in the torch head. When a high frequency high voltage is applied to the electrode (relative to the tip), a pilot arc is established therebetween. As mentioned above, when the torch head is moved toward the workpiece, the arc transfers to the workpiece. Among the disadvantages of non-contact start torches is the expense of the additional circuitry required to generate the pilot arc. These torches may also produce large amounts of high frequency, high voltage electromagnetic waves that can cause electrical interference with other electrical equipment in the area.

By way of contrast, in conventional contact start torches the tip and/or electrode move axially relative to each other along a longitudinal axis of the electrode. For example, the tip may be biased by a spring such that a clearance distance is maintained between the tip and electrode. To initiate a pilot arc, the torch operator places the torch head in contact with the workpiece with sufficient force to cause the forwardly-biased tip to be pushed in a rearward direction relative to the electrode. By compressing the biasing spring and allowing the tip and electrode to make electrical contact, the operator establishes the pilot arc. As the operator moves the torch head away from the workpiece, the tip moves forwardly away from the electrode under the bias of the spring which generates the pilot arc and transfers it to the workpiece. One problem with conventional contact start torches is that relative axial movement between the tip and electrode can result in alignment and axial spacing variations which adversely affect performance. As an example, many torch operators drag the tip across the workpiece as they cut. For optimum performance, it is critical to maintain distance between the tip and electrode because even small variations can compromise cut quality and speed and can also reduce the life of consumable tips and electrodes. Accordingly, there is a need for a contact start torch which can maintain the axial distance between the tip and electrode to prevent alignment and axial spacing variations.

SUMMARY OF THE INVENTION

Among the several objects and features of the present invention is to provide a threadless electrode-cathode locking assembly which is designed to properly center the electrode on the axis of a torch; to provide such an assembly in which good electrical contact between the electrode and cathode is maintained; to provide such an assembly wherein the electrode and cathode can be readily assembled and disassembled for ease of use; to provide such an assembly wherein the electrode is economical to manufacture and thus inexpensive to replace; to provide a consumable electrode of unique configuration which may be used in the aforementioned assembly; and to provide a plasma torch which includes an electrode-cathode locking assembly having the advantages enumerated above.

Briefly, the electrode-cathode locking assembly of the present invention comprises an electrode having a central longitudinal axis, an electrode body at a forward end of the electrode, and an electrode locking surface. The assembly further comprises a cathode having a central longitudinal axis, a cathode body, and a cathode locking surface toward a forward end of the cathode engageable by the electrode locking surface. The assembly also includes contact formations on the electrode and cathode which are engageable with one another so that relative rotation between the electrode and cathode causes the electrode to move in an axial direction relative to the cathode to bring the electrode and cathode locking surfaces into friction engagement with one another, thereby locking the electrode in fixed axial and rotational position relative to the cathode. The contact formations comprising a cam-like contact formation having one or more ramps.

Additionally, among the several objects and features of the present invention is to provide a one-piece tip designed for directing a volume of plasma gas and a volume of secondary gas from a torch having only one gas source; to provide a first unitary tip having flow passaging sized to provide a selected ratio of plasma gas volume to secondary gas volume; to provide a second unitary tip having flow passaging sized to provide a different ratio of plasma gas volume to secondary gas volume and which is readily interchangeable with the first unitary tip; to provide a tip of single-piece construction which is economical to manufacture and thus inexpensive to replace; to provide a consumable tip of unique configuration; and to provide a plasma torch adapted for receiving one or more of the aforementioned tips.

Briefly, the one-piece tip of the present invention comprises a tip body having a central longitudinal axis, a forward end, and a rearward end, and the tip includes a cavity in the tip body which extends from its rearward end to its forward end and which is sized for receiving an electrode therein. An orifice at the forward end of the tip body communicates with the cavity, and a rearwardly facing surface at the rearward end of the tip body is adapted for sealing engagement with a forwardly facing surface on the torch. First flow passaging in the tip body directs a first volume of gas from the torch, constituting plasma gas, to the cavity, and second flow passaging in the tip body directs a second volume of gas from the torch, constituting secondary gas, to an outer perimeter of the tip body. The first flow passaging is sized relative to the second flow passaging to provide a selected ratio of plasma gas flow volume to secondary gas flow volume. The tip is formed as a single unit whereby the ratio of plasma gas flow volume to secondary gas flow volume can be changed to a different ratio simply by replacing the tip with a second tip formed with flow passaging sized to provide the different ratio.

Furthermore, among the several objects and features of the present invention is to provide a plasma torch having a rotational starting mechanism designed to maintain proper alignment and axial spacing between the electrode and the torch tip; to provide such a mechanism in which a pilot arc is generated through contact starting by relative rotational movement between the electrode and tip rather than by relative axial movement therebetween; to provide such a mechanism wherein the electrode and tip are economical to manufacture and thus inexpensive to replace; to provide a consumable electrode of unique configuration which may be used in the aforementioned mechanism; and to provide a consumable tip of unique configuration which may be used in the aforementioned mechanism.

Briefly, the plasma torch having a rotational starting mechanism in accordance with the present invention comprises a cathode having a central longitudinal axis, an electrode mounted axially on the cathode, a tip mounted axially on the torch, and a rotating mechanism carried by the torch and adapted to effect relative rotation between the tip and electrode about an axis extending longitudinally with respect to the cathode. The electrode has a body, an arcing formation on the body, a rearward end and a forward end. The tip has a forward end, a rearward end, a cavity defined by an inner wall, and an orifice at the forward end of the tip which communicates with the cavity for the emission of plasma gas therethrough. The cavity of the tip is configured for receiving the body of the electrode in a non-contact position wherein the electrode is not in contact with the inner wall. The inner wall of the tip and the arcing formation on the body of the electrode are configured so that relative rotation between the tip and electrode away from the non-contact position brings the arcing formation into contact with the inner wall, following which relative rotation back toward the non-contact position creates a gap for the generation of an electric arc between the tip and the arcing formation to start the torch.

BRIEF DESCRIPTION OF THE DRAWINGS

The present invention will become more fully understood from the detailed description and accompanying drawings, wherein;

FIG. 15 is a sectional view the electrode-cathode locking assembly shown in FIG. 13 taken along line 15A—15A;

Corresponding reference characters indicate corresponding parts throughout the several views of the drawings.

DETAILED DESCRIPTION OF THE PREFERRED EMBODIMENTS

Figure 1:
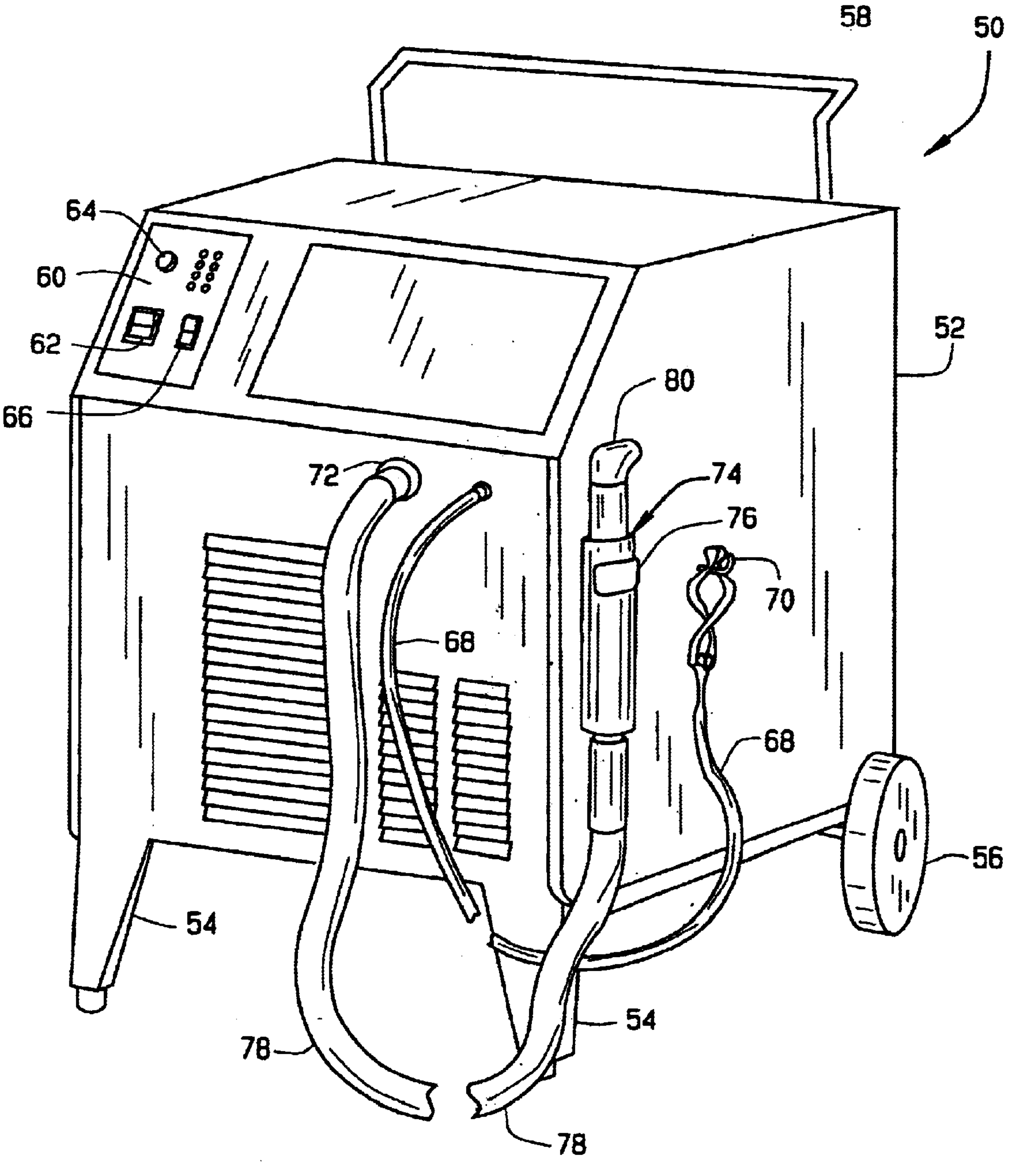
FIG. 1 is a perspective view of a plasma cutting system, including a plasma torch.

Referring to FIG. 1, a plasma cutting system of the present invention is designated generally by reference numeral 50. The cutting system includes a portable housing 52 having a pair of front legs 54 and a pair of rear wheels 56. A handlebar 58 is provided at the rear of the housing for tilting the housing rearwardly and transporting the cutting system to another location. A control panel 60 is provided at the front of the housing for convenient operation of the cutting system. The control panel may include an on/off power switch 62, a rheostat 64 for selecting a variable output current, and an on/off switch 66 for the gas supply. A power supply is disposed inside the housing, and a ground wire 68 can be clipped to a hook 70 on the side of housing 52. Gas from an external source (not shown) is provided to the cutting system through an inlet port (not shown) on housing 52. Typically, the gas is either oxygen or nitrogen, but other suitable gases are known to those skilled in the art. The gas travels through housing 52 inside a gas supply tube (not shown) which extends from the inlet port to an outlet port 72 on the front of housing 52.

The plasma cutting system also includes a plasma torch 74, which is shown in a holster 76 on the side of housing 52. The torch is coupled to outlet port 72 on by a flexible conduit 78 which carries the gas supply tube. The electrical leads which connect the power supply to the torch are also disposed within the conduit. The gas and electrical connections to the torch are well-known to those skilled in the art.

Figure 2:
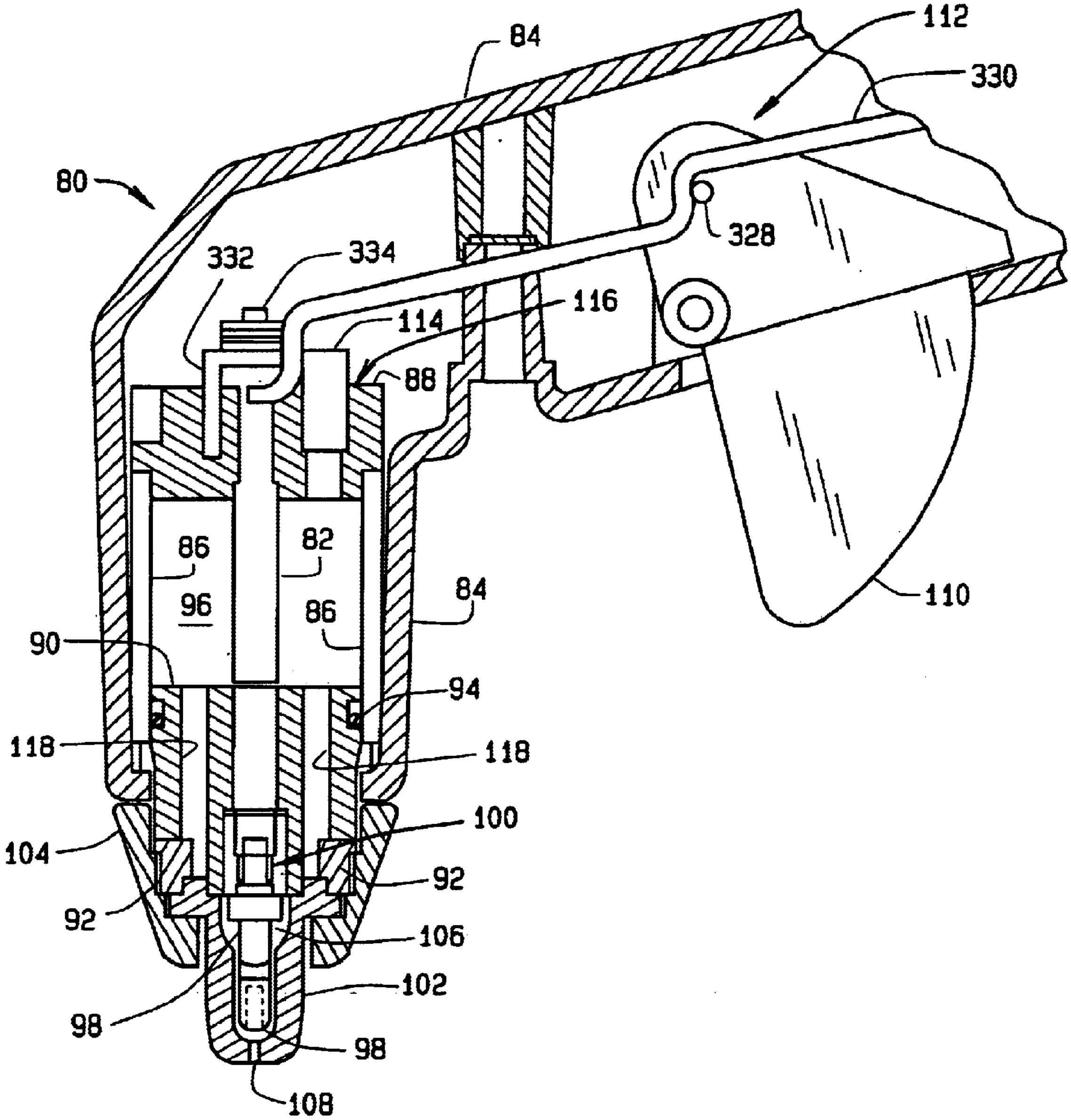
FIG. 2 is an enlarged, fragmentary sectional view of the plasma torch of FIG. 1.

The torch head 80 is shown in cross-section in FIG. 2. A generally cylindrical cathode 82 is disposed along a center axis of the torch head within a casing 84. A tube spacer 86 extends between a pair of insulators 88 and 90 which isolate the cathode from an anode 92 mounted coaxially with the cathode. The anode 92 is preferably a thread ring disposed circumferentially around the forward (lower) portion of the front insulator 90. An O-ring 94 provides an airtight seal between the front insulator 90 and an air chamber 96 inside the tube spacer 86. An electrode 98 is attached to a forward end of the cathode 82 by the locking assembly 100 of the present invention.

A tip or nozzle 102 is attached to the torch head 80 and makes electrical contact with the anode 92. The tip 102 is held in place by a tip retaining cap 104. The tip 102 has a cavity 106 for receiving the electrode 98, and an orifice 108 at the forward end of the tip 102 communicates with the cavity 106. A trigger 110 extending outside the casing 84 is operably coupled with the cathode 82 such that depressing the trigger will cause the cathode 82 to rotate relative to the tip 102. Similarly, releasing the trigger 110 will cause the cathode 82 to rotate in the opposite direction relative to the tip 102. The structure of a rotating mechanism 112 is discussed in more detail below in connection with the rotational contact starting mechanism.

Figure 22:
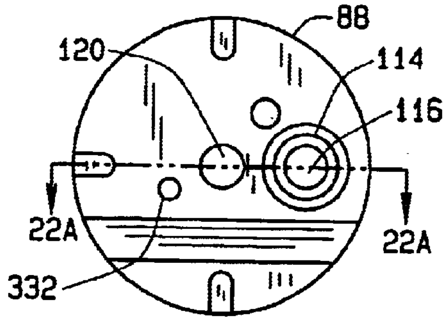
FIG. 22 is a top view of the rear insulator, roll pin and hose barb shown in FIG. 2.
Figure 22A:
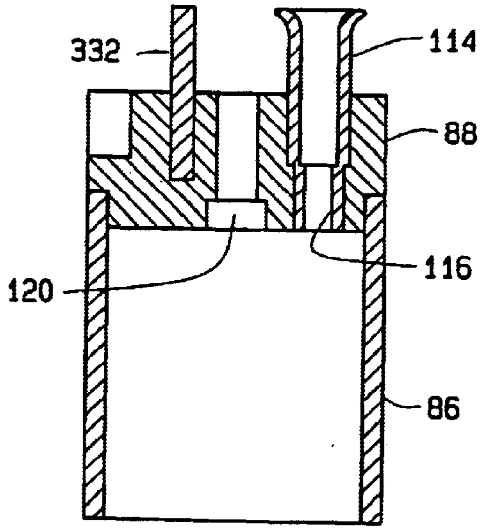
FIG. 22A is a sectional view of the rear insulator, roll pin, hose barb and tube spacer taken along lines 18A—18A of FIG. 12.

The gas supply tube from the housing extends to a hose connection 114 (shown in detail in FIGS. 22–22A), which is disposed in a bore 116 in the rear insulator 88 and directs the gas into the air chamber 96 within the tube spacer 86 between the front and rear insulators 88, 90. Then, the gas passes through one of a plurality of holes 118 in the front insulator (shown in FIG. 28A) before entering the tip cavity 106. A control bore 120 in the rear insulator 88 (shown in FIGS. 22–22A) is sized to permit the cathode 82 to pass therethrough.

Figure 3:
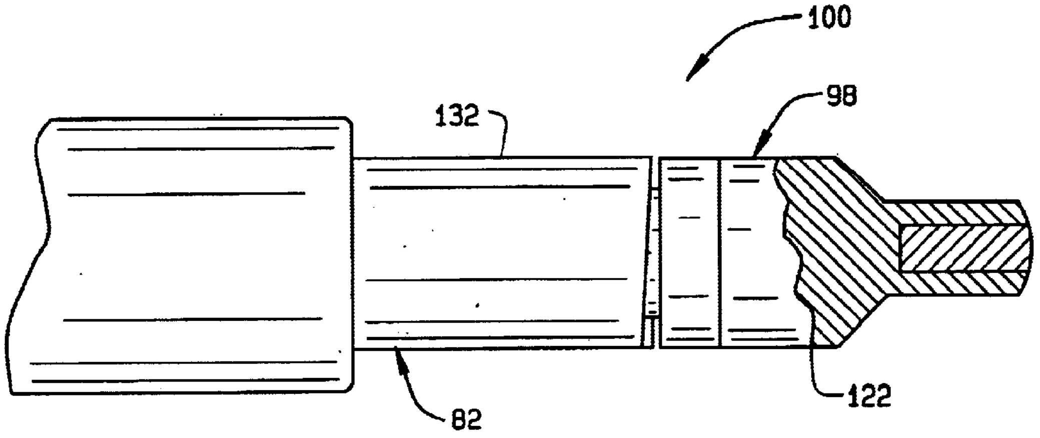
FIG. 3 is an enlarged, fragmentary view of the plasma torch of FIG. 1 and a preferred embodiment of an electrode-cathode locking assembly of the present invention, portions of the electrode being broken away to reveal further details of construction.
Figure 4:
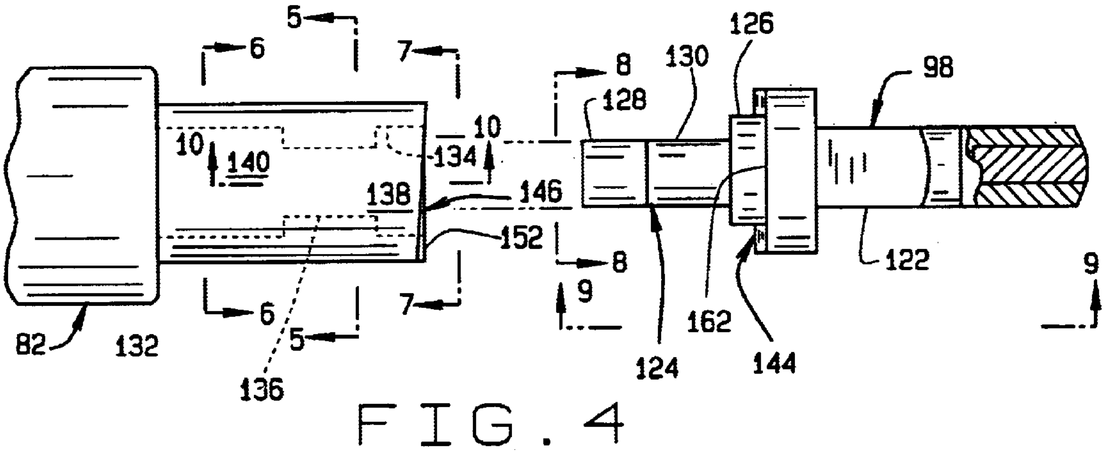
FIG. 4 is an exploded view of the electrode-cathode locking assembly of FIG. 3.
Figure 4A:
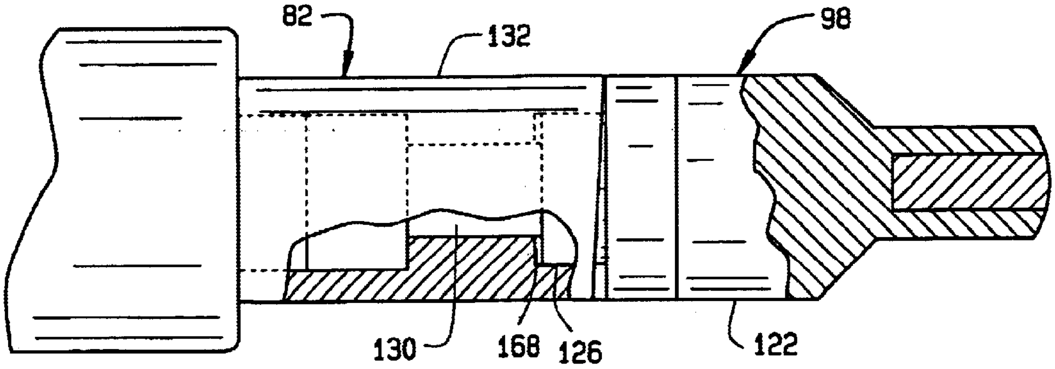
FIG. 4A is a view similar to FIG. 3 but with the electrode locked within the cathode.

Referring now to FIGS. 3–4A, a preferred embodiment of the electrode-cathode locking assembly 100 of the present invention is shown. In FIGS. 3 and 4A, the locking assembly 100 is depicted with the electrode 98 and cathode 82 locked together. By contrast, FIG. 4 is an exploded view of the locking assembly 100 with the electrode 98 and cathode 82 aligned so that the electrode 98 can be received in the front end of the cathode 82.

Figure 9:
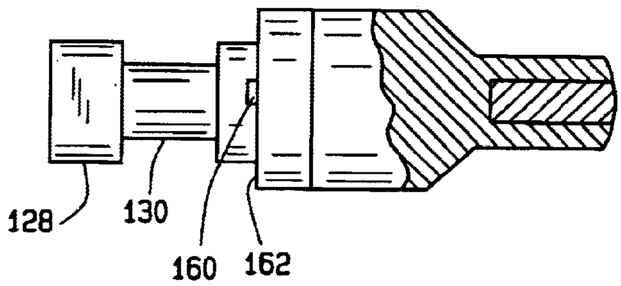
FIG. 9 is a side elevational view of the electrode, with portions broken away, taken along line 9—9 of FIG. 4.

The electrode 98 has a central longitudinal axis, an electrode body 122 at a forward end of the electrode, a locking formation 124 toward a rearward end of the electrode, and a centering formation 126. In the preferred embodiment, the centering formation 126 has an annular shoulder 126 which protrudes axially rearwardly from the electrode body 122. Referring also to FIG. 9, the electrode locking formation 124 comprises an elongated head 128 disposed at the end of a neck, or tail stock, 130 which protrudes axially rearwardly from the shoulder 126 of the electrode body 122. As best shown in FIG. 9, the head 128 is generally rectangular in cross-section.

The cathode 82 shown in FIG. 4 has a central longitudinal axis, a cathode body 132, a recess 134 in a forward end of the cathode body 132 extending axially rearwardly with respect to the cathode body 132 for receiving the electrode locking formation 124, and a threadless locking formation 136 in the recess 134 engageable by the electrode locking formation 124.

Figure 5:
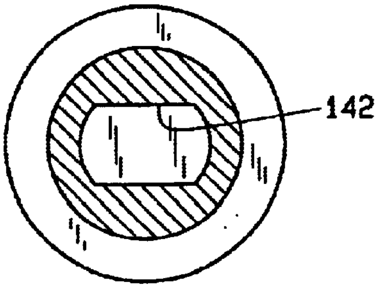
FIG. 5 is a sectional view of the cathode taken along line 5—5 of FIG. 4.

As indicated by broken lines in FIG. 4, the generally cylindrical cathode recess 134 is divided into a forward chamber 138 and a rearward chamber 140 by the cathode locking formation 136. The forward chamber 138 is adapted to receive the shoulder 126 of the electrode body, and the rearward chamber is adapted to receive the electrode locking formation 124. As shown in FIG. 5, the cathode locking formation 136 constricts the recess to define a slot 142 having a substantially rectangular outline which is slightly larger than the outline of the electrode elongated head 128.

Thus, the cathode locking formation 136 permits the head 128 to travel through the slot 142 and to enter the rearward chamber 140. The length of the slot 142 (i.e., the distance between the forward and rearward chambers) is a function of the length of the electrode neck 130.

Figure 6:
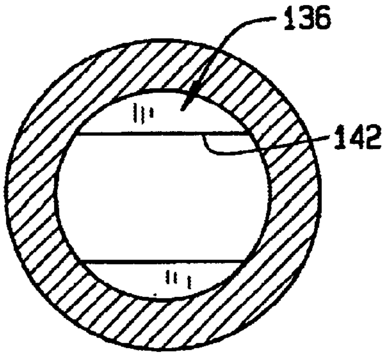
FIG. 6 is a sectional view of the cathode taken along line 6—6 of FIG. 4.
Figure 6A:
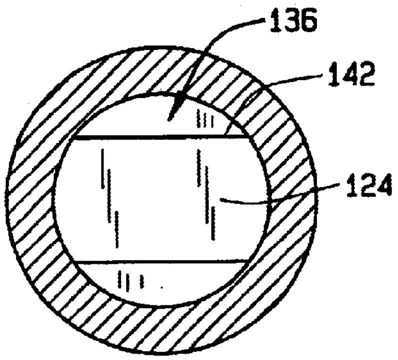
FIG. 6A is a view similar to FIG. 6 but showing an end of the electrode being inserted in the cathode.

FIG. 6 is an enlarged view of the cathode locking formation 136 taken from the rearward chamber 140. Similarly, FIG. 6A is a view of the cathode locking formation 136 taken from the rearward chamber but with the head 128 of the electrode locking formation 124 disposed in the slot 142. In FIG. 66, the head 128 is in the rearward chamber and has been rotated ninety degrees with respect to the cathode 82.

Referring again to FIG. 4, the electrode 98 and cathode 82 each have threadless contact formations 144, 146 respectively, which are engageable with one another when the electrode 98 engages the cathode 82. At least one of the contact formations 144, 146 is a cam-like contact formation having one or more ramps. In the preferred embodiment, both contact formations 144, 146 are cam-like contact formations.

Figure 7:
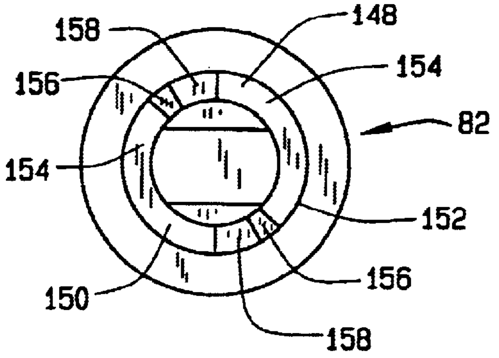
FIG. 7 is an end view of the cathode of the present invention taken along line 7—7 of FIG. 4.
Figure 8:
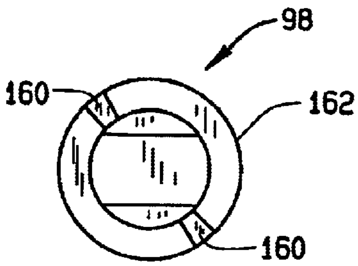
FIG. 8 is an end view of the electrode of the present invention taken along line 8—8 of FIG. 4.

As shown in FIG. 7, the cathode 82 has a contact formation 146 which comprises two ramps 148, 150 formed on an annular forwardly facing surface 152 of the cathode body 132. Preferably, each ramp has a first inclined segment 154, a flat segment 156, and a second inclined segment 158. The cathode contact formation 146 is engageable with the electrode contact formation 144 (best shown in FIGS. 8 and 9). The electrode contact formation 144 comprises a pair of protrusions 160 formed on an annular rearwardly facing surface 162 of the electrode body 122. The protrusions 160 are located on opposite sides of the neck 130 to correspond with the two flat segments 156 of the cathode contact formation 146.

The flat segments 156 provide a stopping surface for the corresponding protrusions. Generally, the inclined segments 152 are less desirable stopping surfaces because they are more likely to permit slippage due to vibration and because they impart a greater shearing force on the protrusion 160. Thus, the stopping surface should have a relatively small slope and preferably no slope (i.e., a flat segment).

With the electrode 98 and cathode 82 oriented as shown in FIG. 4, the head 128 (best shown in FIG. 9) can be inserted into the slot 142. Otherwise, the head 128 will not be aligned with the cathode locking formation 136. Once the head 128 has cleared the slot 142 and entered the rearward chamber 140 of the cathode recess 134, the electrode 98 is rotated (FIG. 6B) to prevent the head 128 from reentering the slot.

Figure 11:
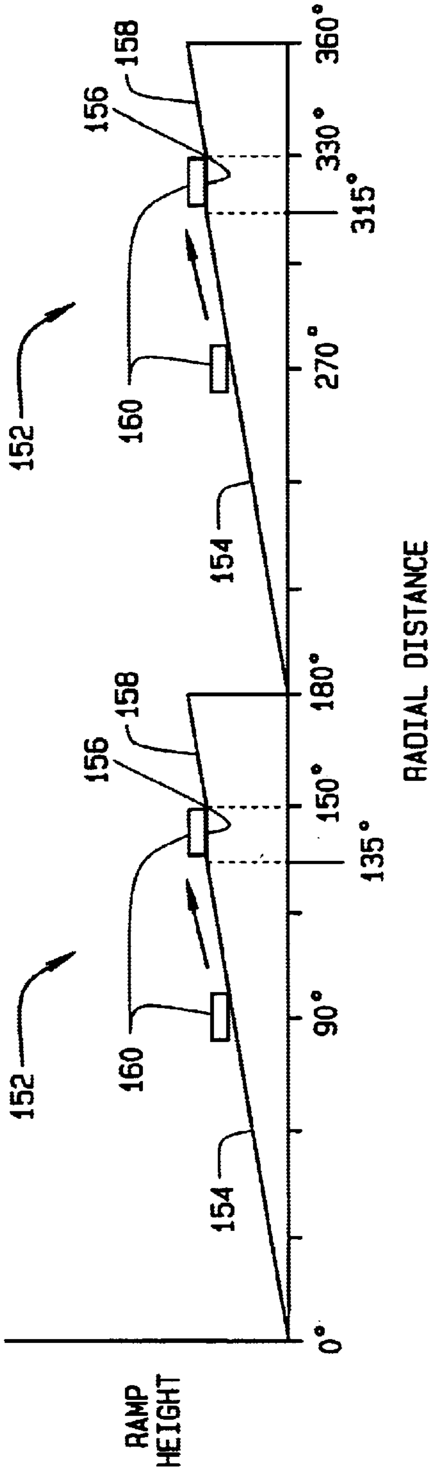
FIG. 11 is a diagram illustrating the relative height of the ramps on the cathode versus radial distance in accordance with the preferred embodiment of the electrode-cathode locking assembly of FIGS. 3–10A.

At about the same time the head 128 advances into the rearward chamber 140, the shoulder 126 on the electrode body 98 contacts the forward end of the cathode locking formation 136 and the protrusions 160 on the rearwardly facing surface of the electrode body 98 contact the ramps 148 and 150 on the forwardly facing surface of the cathode 82. Then, as the electrode 98 is rotated in a clockwise direction relative to the cathode 82, the protrusions 160 advance up their respective first inclined segments 154. As shown in FIG. 11, the protrusions 160 make contact with the ramps 152 at corresponding positions on their respective first inclined segments 154. As the protrusions travel upwardly along the first inclined segments 154 of the cathode ramps 152, the electrode 98 is forced axially away from the cathode 82 so that the head 128, which is also rotating, moves towards the rearward end of the cathode locking formation 136.

Figure 6B:
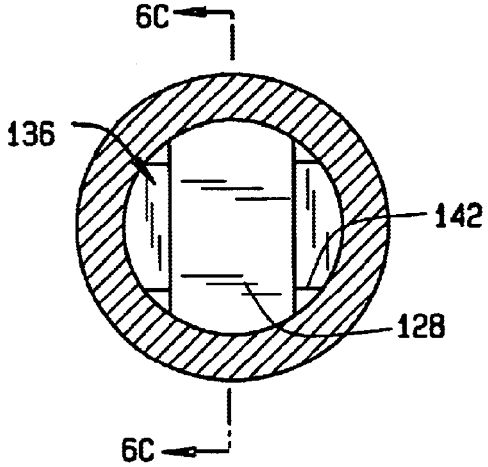
FIG. 6B is a view similar to FIG. 6A but with the electrode rotated ninety degrees about its longitudinal axis so that the electrode is locked in fixed axial position relative to the cathode.
Figure 6C:
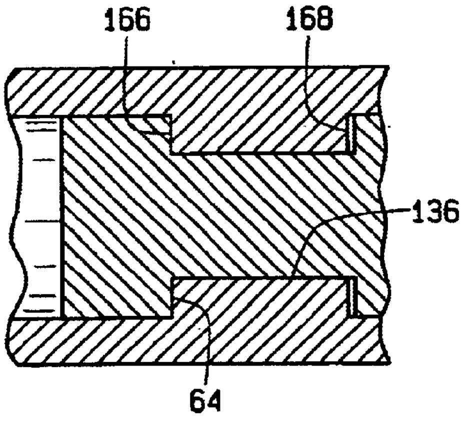
FIG. 6C is a fragmentary sectional view of the electrode-cathode locking assembly taken along line 6C—6C of FIG. 6B.

The tolerances for the electrode 98 and cathode 82 are such that the protrusions 160 should come to rest on their respective flat segments 156 (as shown in FIG. 11) at the same time a forwardly facing locking surface 164 of the electrode locking formation 124 bears against a rearwardly facing locking surface 166 of the cathode locking formation 136 (FIG. 6C). As shown in FIGS. 4A and 6B–6C, the relative axial movement between the electrode 98 and cathode 82 which causes the electrode locking surface 164 to frictionally engage the cathode locking surface 166 also creates a small gap 168 between the forward end of the cathode locking formation 136 and the shoulder 126 of the electrode body 98.

Figure 10A:
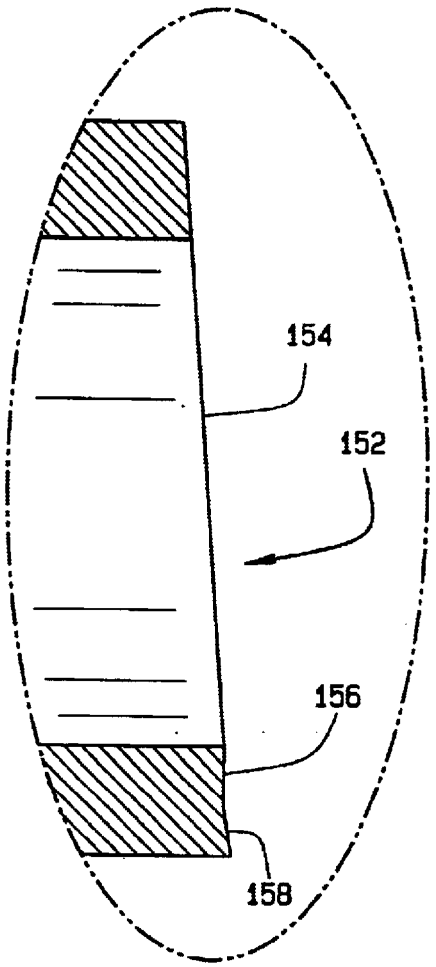
FIG. 10A is an enlarged, fragmentary view of the cathode of the present invention within area 10A of FIG. 10.
Figure 10:
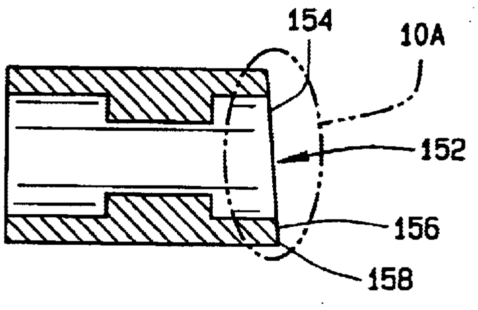
FIG. 10 is a sectional view of the cathode of the present invention taken along line 10—10 of FIG. 4.

FIGS. 10 and 10A show a ramp 152 corresponding to either one of the ramps 152 illustrated in FIG. 11. The first inclined segment 154 preferably extends for approximately 135 radial degrees and terminates in a flat portion 156 which preferably extends for approximately 15 radial degrees. A second inclined segment 158 having the same slope as the first inclined segment 154 extends from the flat segment 156 to the beginning of the second ramp 152. The purpose of the second inclined segment 158 is to engage the protrusion 160 in the event that too much torque is applied to the electrode 98 or if the tolerances are not exact.

As those skilled in the art will readily appreciate, the locking assembly 100 may include one or more ramps and the length of each ramp will depend upon the total number of ramps. Similarly, the ramps may or may not include a flat segment, and the length of each segment may vary depending on a number of factors including the total number of ramps and the size of the corresponding protrusions. Moreover, the slope of the first inclined segment need not be the same as the slope of the second inclined segment. It is also contemplated that the protrusion(s) may be formed on the cathode and the corresponding ramp(s) may be disposed on the electrode.

Figure 12:
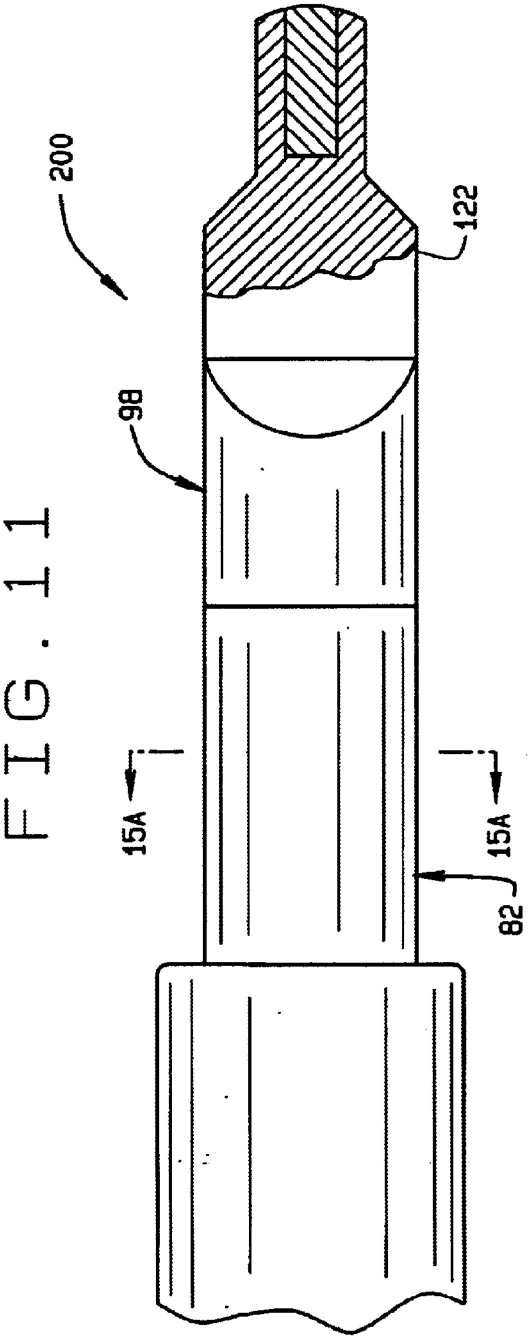
FIG. 12 is an enlarged, fragmentary view of the plasma torch of FIG. 1 and another preferred embodiment of an electrode-cathode locking assembly of the present invention, portions of the electrode being broken away to reveal further details of construction.
Figure 13:
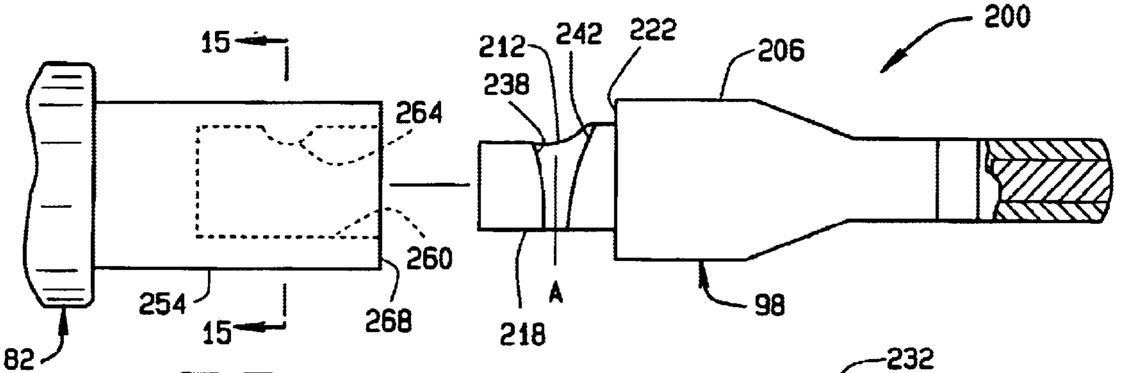
FIG. 13 is an exploded view of the electrode-cathode locking assembly of FIG. 12.
Figure 14A:
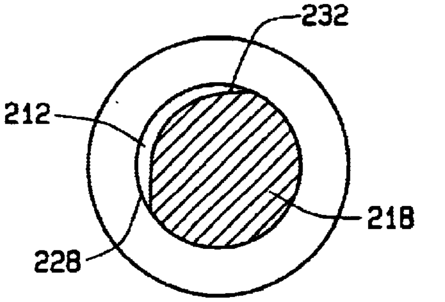
FIG. 14A is a section view of the electrode shown in FIG. 14 taken along line 14A—14A.
Figure 14:
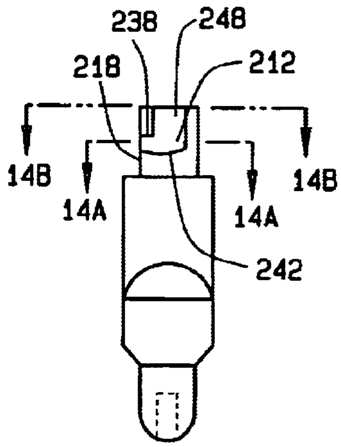
FIG. 14 is an isolated side view of the electrode shown in FIG. 13.

Referring now to FIGS. 12 and 13, another preferred embodiment of an electrode-cathode locking assembly 200 of the present invention is shown. In FIG. 12 the locking assembly 200 is depicted with the electrode 98 and cathode 82 locked together. By contrast, FIG. 13 is an exploded view of the locking assembly 200 with the electrode 98 and cathode 82 aligned so that the electrode 98 can be received in the front end of the cathode 82. The electrode 98 has a central longitudinal axis, an electrode body 206 at a forward end of the electrode 98, and a threadless locking formation, or groove, 212 in a tail stock 218 that extends axially reward from an annular shoulder 222 of body 206. Referring also to FIG. 14 and 14A, the electrode locking groove 212 includes a first end 228 and a second end 232, and has a diminishing depth such that the depth of groove 212 into tail stock 218 at first end 228 is greater than the depth at second end 232. More specifically, as best shown in FIG. 14A, groove 212 begins at first end 228 having a specific depth, and proceeding from the first end 228 to the second end 232, the depth of groove 212 progressively lessens until groove 212 ends at the second end 232. Additionally, locking groove includes a cam-like contact formation, or rearward edge 238 and a forward edge 242, which define the width of the locking groove 212, best shown in FIG. 13. The edges 238 and 242 define the locking groove 212 such that the width of the groove 212 at first end 228 is greater than the width of the locking groove 212 at the second end 232. Therefore, the rearward edge, or contact formation, 238 inclines toward the forward end of tail stock 218 as the rearward edge 238 proceeds from the first end 228 to the second end 232. Conversely, the forward edge 242 declines toward the rearward end of tail stock 218 as the forward edge 242 proceeds from the first end 228 to the second end 232. In the preferred embodiment, the contact formation, or rearward edge, 238 inclines toward a center line ‘CL’ at a lesser rate than the forward edge 242 declines toward the center line CL.

Figure 14B:
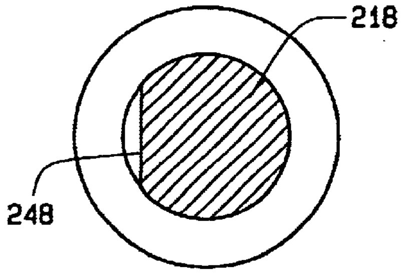
FIG. 14B is a sectional view of the electrode shown in FIG. 14 taken along line 14B—14B.

As best shown in FIGS. 14 and 14B, tail stock 218 further includes a flat surface 248 extending rearward from the locking groove 212. The flat surface 248 extends longitudinally rearward along tail stock 218 from the locking groove first end 228 to the distal, or rear most end, of tail stock 218.

The cathode 82, as shown in FIG. 13, has a central longitudinal axis, a cathode body 254, a recess 260 in a forward end of the cathode body 254 extending axially rearwardly with respect to the cathode body 254 for receiving the electrode tail stock 218. The recess 260 includes a formation 264 comprising a detent or protrusion. Formation 264 is utilized as cathode cam-like contact formation engageable with the electrode contact formation 238, and a cathode locking formation engageable with the electrode locking formation 212. In the preferred embodiment, the formation 264 is semi-spherical in shape. However, it is envisioned that the formation 264 could be any suitable shape to engage locking groove 212, for example, formation 264 could be cylindrical having a longitudinal axis perpendicular to the longitudinal axis of the cathode 82, or formation 264 could be cubical having a longitudinal axis perpendicular to the longitudinal axis of the cathode 82.

Figure 15:
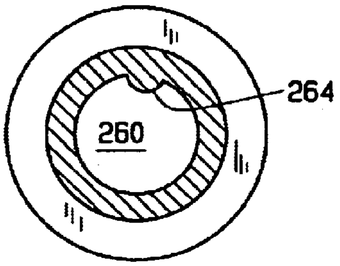
FIG. 15 is a sectional view of the cathode shown in FIG. 13 taken along line 15—15.

As shown in FIG. 15, the cathode formation 264 constricts the recess 260. Thus, as the electrode tail stock 218 is inserted into the cathode recess 260, the tail stock must be rotationally oriented such that flat surface 248 aligns with cathode formation 264, thereby allowing the tail stock 218 to be inserted into the recess 260. Referring to FIG. 13, the locking groove 212 and the formation 264 are respectively located in the tail stock 218 and the recess 260 such that when tail stock 218 is completely inserted into recess 260, shoulder 222 contacts a leading edge 268 of the cathode 82 and the locking groove first end 228 and formation 264 are aligned adjacent each other.

Figure 15A:
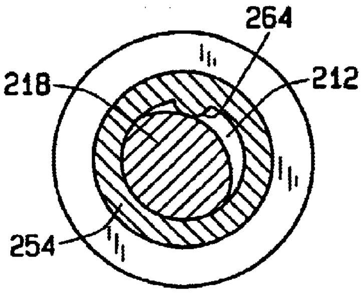
Figure 16:
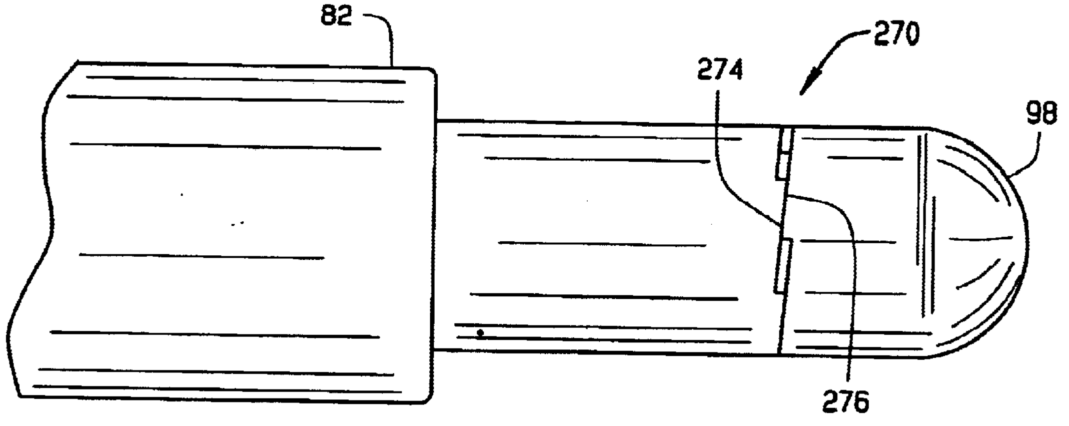
FIG. 16 is an enlarged, fragmentary view of a second embodiment of an electrode-cathode locking assembly of the present invention.

Once the tail stock 218 is completely inserted into the recess 260, the electrode 98 is rotated into locking engagement with the cathode 82. The locking engagement is caused by longitudinal and horizontal forces created by the frictional contact between the cathode formation 264 and both the electrode contact formation 238 and locking formation 212, best shown in FIG. 15A. As described above, when the tail stock 218 is completely inserted into the recess 260, the first end 228 of the groove 212 aligns adjacent the cathode formation 264. Rotation of the electrode 98 and cathode 82 relative to one another causes the cathode formation 264 to substantially simultaneously contact the bottom of the groove 212 and electrode contact formation, or rearward edge, 238. As the electrode 98 and cathode 82 are rotated relative to on another, the contact between the cathode formation 264 and the electrode contact formation 238 creates a longitudinal force that places electrode annular shoulder 222 in frictional locking engagement with cathode leading edge 268. Additionally, the contact between the cathode formation 264 and the electrode locking formation, or groove, 212 creates an increasing horizontal force on tail stock as the electrode is rotated, which places the tail stock 218 in frictional locking engagement with the side wall of the recess 260. More specifically, when the cathode locking formation 264 and the groove first end 228 are aligned, and the electrode 98 is rotated relative to the cathode 82, the locking formation 226 contacts the bottom of the groove 212. As rotation of the electrode 98 continues, the lessening depth of the groove 212 creates an increasing horizontal force on the tail stock 218 until the tail stock 218 is in locking engagement with the side wall of the recess 260.

Furthermore, the depth of the groove 212 and the incline of electrode contact formation 238, are calibrated such that the cathode formation 264 will be aligned substantially adjacent the groove second end 232 when the tail stock 218 and the electrode annular shoulder 222 are substantially simultaneously placed in locking engagement with the side wall of the recess 260 and the leading edge 268 of the cathode 82. Further yet, the length of the electrode locking formation, or groove, 212 is calibrated so that when the cathode formation 264 is aligned substantially adjacent the groove second end 232, and the electrode 98 is in locking engagement with the cathode 82, as described above, the electrode 98 is rotationally oriented in a non-contact position with respect to torch tip 102 when the torch tip 102 is installed on the torch head 80.

FIGS. 16–21 illustrate an alternate embodiment 270 of the electrode-cathode locking assembly which has particular utility for relatively large torches. The alternate embodiment differs from the preferred embodiment of FIGS. 3–11 primarily in that a set of mating ramps 272 are formed on the rearwardly facing surface of the electrode 98 rather than a set of protrusions. The cathode contact formations of the second embodiment also differ from the preferred embodiment of FIGS. 3–11 in that there are four ramps 273 formed on the forwardly facing surface of the cathode 82, and the ramps 273 do not have a flat segment. While a different number of ramps could be selected, it is preferred that the same number of ramps are formed on both the cathode 82 and the electrode 98. Another difference between the second embodiment and the preferred embodiment of the locking assembly 270 is the generally semi-spherical shape of the forward end of the electrode body.

Figure 17:
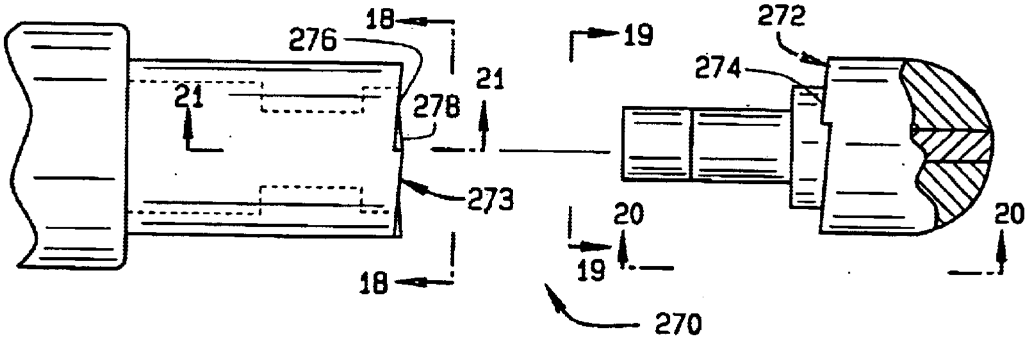
FIG. 17 is an exploded view of the locking assembly of FIG. 12.
Figure 17A:
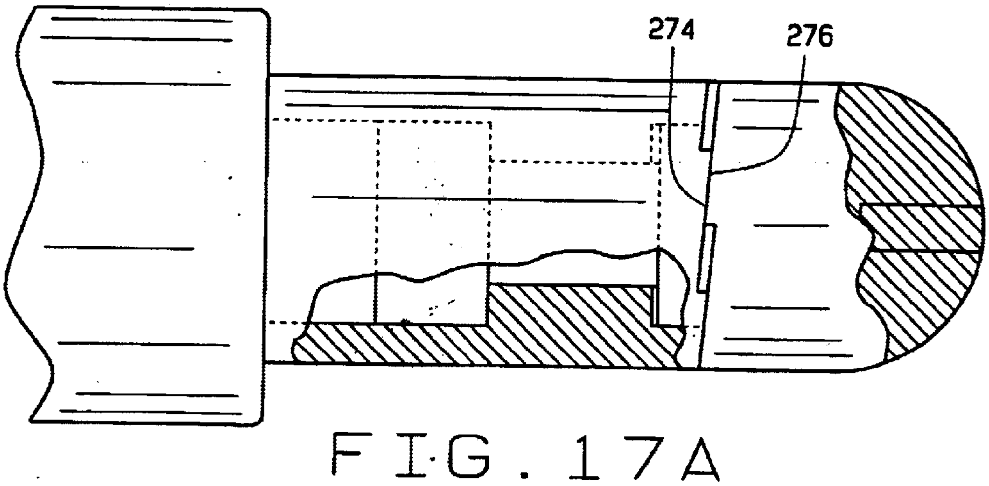
FIG. 17A is a view similar to FIG. 17 but with the electrode locked within the cathode.

In FIGS. 17 and 17A, it can be seen that the rearwardmost portion 274 of each ramp 272 on the electrode contacts a generally forward portion 276 of a corresponding ramp 273 on the cathode when the electrode 98 engages the cathode 82 in a locked position. As with the preferred embodiment, the electrode 98 and cathode 82 of the second embodiment are oriented (as shown in FIG. 17) so that the elongated head 128 (best shown in FIG. 20) will pass through the slot 142 of the cathode locking formation 136 before the cathode 82 and electrode 98 can be locked together. In this orientation, the rearwardmost edge of each electrode ramp 272 initially contacts a generally rearward portion 278 of each corresponding cathode ramp 273. Consequently, relative rotational movement in a clockwise direction between the electrode 98 and the cathode 82 will cause the electrode 98 to move in an axial direction with respect to the cathode 82. The locking formations are sized so that a friction fit is effected between the forwardly facing surface on the head 128 of the electrode locking formation 124 and the rearwardly facing surface of the cathode locking formation 136 at the same time a friction fit is effected between the rearwardmost portion of each electrode ramp 272 and a generally forward portion of the corresponding cathode ramp 273. Obviously, the slope of the ramps could be reversed so that the same result would be obtained by rotation of the electrode 98 in a counterclockwise direction with respect to the cathode 82.

Figure 18:
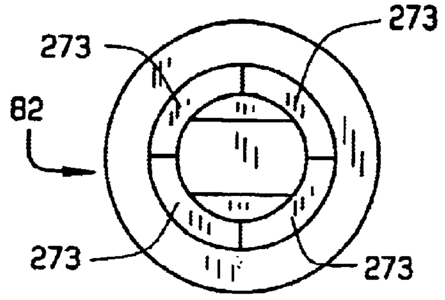
FIG. 18 is an end view of the cathode taken along line 18—18 of FIG. 17.
Figure 18A:
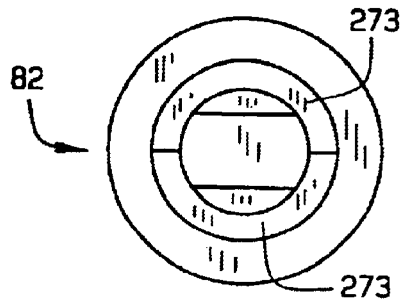
FIG. 18A is a view similar to FIG. 18 but with only two ramps formed on the cathode.
Figure 19:
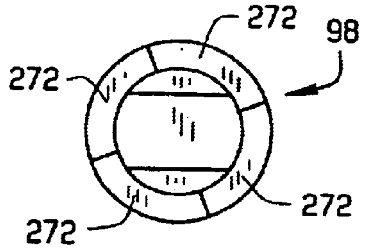
FIG. 19 is an end view of the electrode of the present invention taken along line 19—19 of FIG. 17.
Figure 19A:
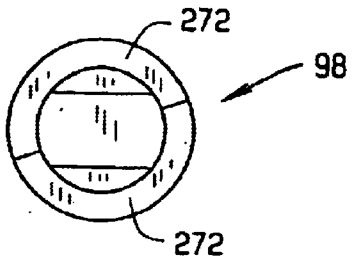
FIG. 19A is a view similar to FIG. 19 but with only two ramps formed on the electrode.
Figure 20:
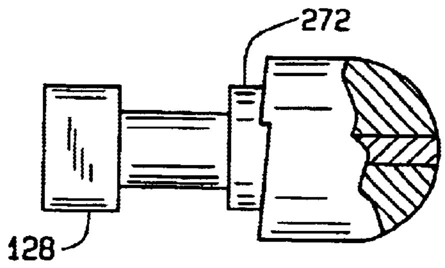
FIG. 20 is a side elevational view of the electrode of the present invention taken along line 20—20 of FIG. 17.
Figure 21:
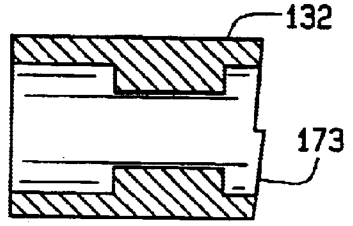
FIG. 21 is a sectional view of the cathode of the present invention taken along line 21—21 of FIG. 17.

With reference to FIGS. 17–21, it can be seen in FIG. 18 and 19 that the cam-like contact formations of the second embodiment include four ramps 73 formed at intervals on the cathode 82 (FIG. 18) and four ramps 272 formed at like intervals on the electrode 98 (FIG. 19). By contrast, the contact formations depicted in FIGS. 18A and 19A have only two cathode ramps 273 and only two electrode ramps 272. Those skilled in the art will appreciate that even a single cathode ramp and a single electrode ramp could adequately accomplish the purposes of the present invention. Furthermore, it may be possible to employ more than four pairs of mating ramps, but a large number of ramps will decrease the maximum angle of rotation for the electrode locking formation with respect to the cathode locking formation. Thus, the efficacy of the locking assembly may be compromised by forming an excessive number of ramps on the cathode and electrode. Regardless of the total number of ramps, the embodiment of FIGS. 16–21 preferably does not include any flat segments.

The term "cam-like" is used herein to describe any threadless structure or formation on the electrode 98 or the cathode 82 which is adapted to make contact with a corresponding structure or formation on the cathode 82 or electrode 98 during relative rotation between the electrode 98 and cathode 82 and to effect a friction fit between the electrode 98 and cathode 98. A protrusion or detent is one specific example of a cam-like formation, and a ramp or a groove edge is another example.

Figure 23:
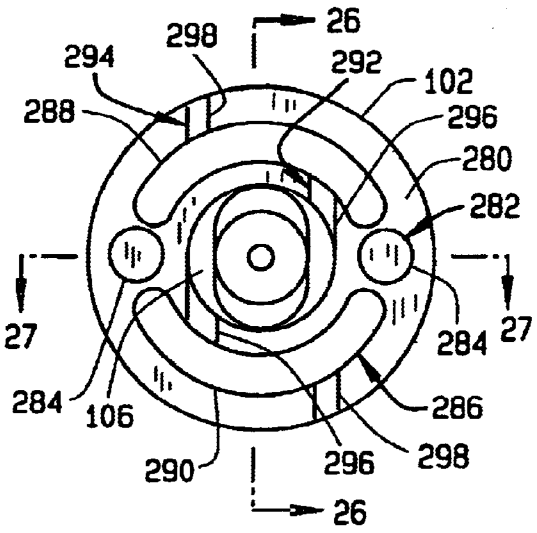
FIG. 23 is an enlarged, top view of the metering tip shown in FIG. 2.
Figure 32:
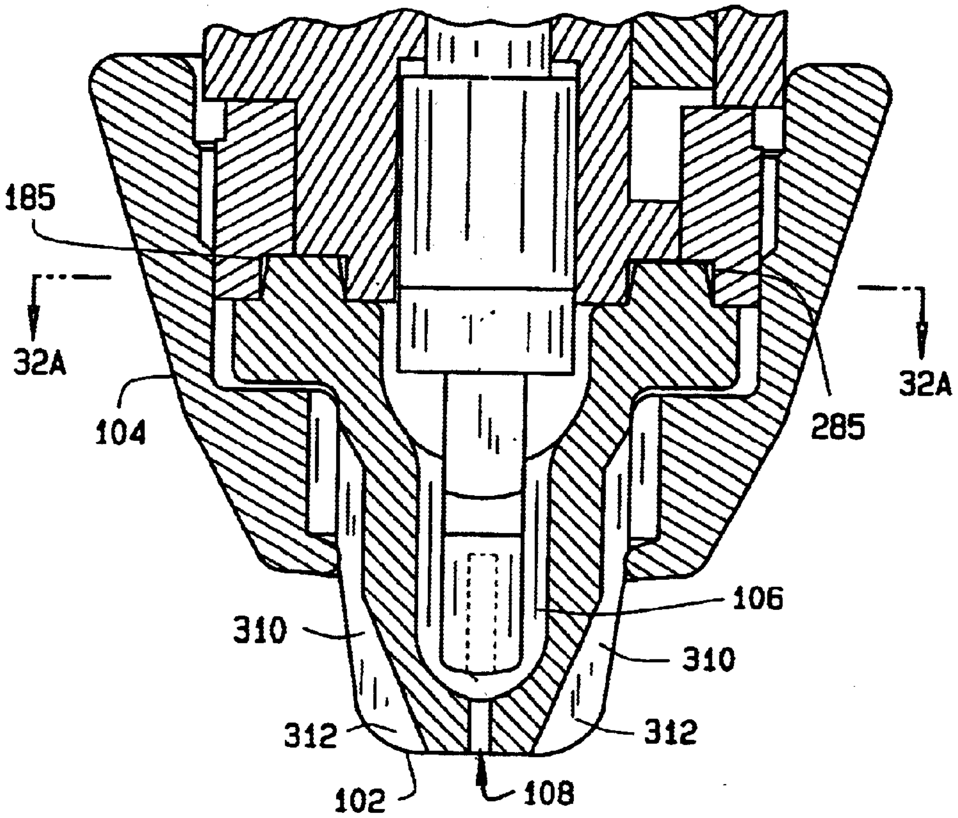
FIG. 32 is an enlarged, fragmentary sectional view of the forward end of the plasma torch of FIG. 1 wherein axial grooves extending along the exterior surface of the tip body have bottoms which slope inwardly toward the orifice at the forward end of the tip body.

Turning to FIGS. 23–29, a preferred construction of the torch tip 102 is shown. With reference to FIG. 23, the top of the tip body has a rearwardly facing surface 280 adapted for sealing engagement with a forwardly facing surface on the torch head. A registration means 282 located on the rearwardly facing surface of the tip body is engageable with the torch head to hold the tip 102 in a predetermined fixed angular position relative thereto. The registration means 282 comprises a pair of registration pins 284 extending from the rearwardly facing surface 280 of the tip body. Each of the pins 284 is received in a corresponding hole 285 (FIG. 32) in the forwardly facing surface of the front insulator inside the torch head. The tip retaining cap 104 supports the friction fit between the tip 102 and the torch head 80.

The tip 102 has a cavity 106 for receiving the electrode 98, and the rearwardly facing surface 280 of the tip body has grooving 286 formed therein for receiving gas from the torch when the tip 102 is in sealing engagement with the torch head. The grooving 286 comprises opposing first and second arcuate grooves 288, 290 located on either side of the cavity 106.

Referring to FIG. 23, the rearwardly facing surface 280 of the tip body also includes first and second flow passaging 292, 294 for directing a first and second volume of gas from the single volume of gas in the torch. The first flow passaging 292 comprises first and second plasma gas flow channels 296 in the rearwardly facing surface extending from the first and second grooves 288, 290, respectively, to the cavity 106. The second flow passaging 294 comprises first and second secondary gas flow channels 298 in the rearwardly facing surface extending from the first and second grooves 288, 290, respectively, to the outer perimeter of the tip body. The plasma gas flow channels 296 are preferably configured to direct the flow of plasma gas generally tangentially with respect to the cavity 106 of the tip. It has been found that this configuration of the plasma gas flow channels advantageously provides for swirling of the plasma gas inside the cavity 106 when the electrode is disposed therein. The two plasma gas flow channels 296, 298 are connected to the cavity 106 generally on opposite sides of the cavity 106.

Figure 24:
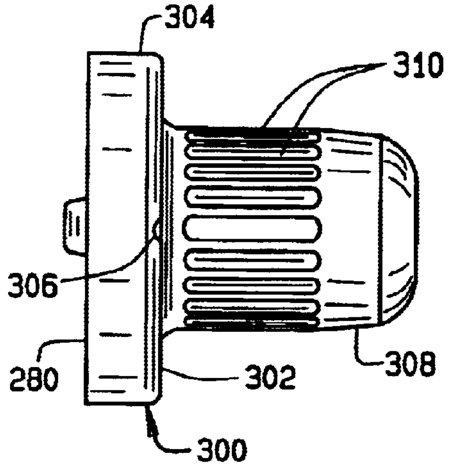
FIG. 24 is an enlarged, front elevational view of the tip of FIG. 23.
Figure 26:
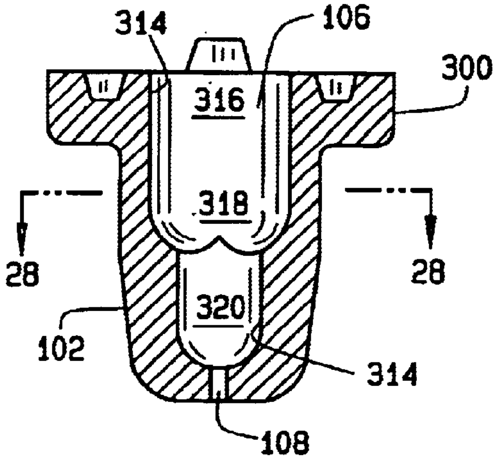
FIG. 26 is a sectional view of the tip taken along lines 26—26 of FIG. 23.
Figure 27:
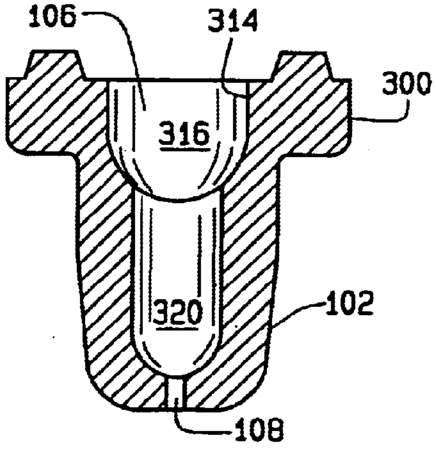
FIG. 27 is a sectional view of the tip taken along lines 27—27 of FIG. 23.

As can be seen in FIGS. 24, 26, and 27, the tip body has a peripheral flange 300 around its rearward (upper) end. The flange 300 projects generally radially outwardly with respect to the central longitudinal axis of the tip 102. The flange 300 is defined by a forwardly facing surface 302 opposite the rearwardly facing surface 280 of the tip body and by an outer rim 204.

Importantly, the tip 102 is formed as a single unit having a given ratio of plasma gas flow volume to secondary gas flow volume as a function of the size of the flow passaging. The torch operator will preferably have a number of such tips available so that the ratio of the plasma gas flow volume to secondary gas flow volume can be quickly changed to a different ratio simply by replacing the first tip with a second tip formed with flow passaging sized to provide the different ratio. It may be desirable to change the ratio of plasma gas to secondary gas and thereby increase or decrease the density of gas in the cavity. Moreover, the present invention is directed to a torch having a single supply of gas for both plasma gas and secondary gas. By contrast, conventional tip metering requires the operator to replace multiple parts on a torch having a single supply of plasma and secondary gas.

Figure 25:
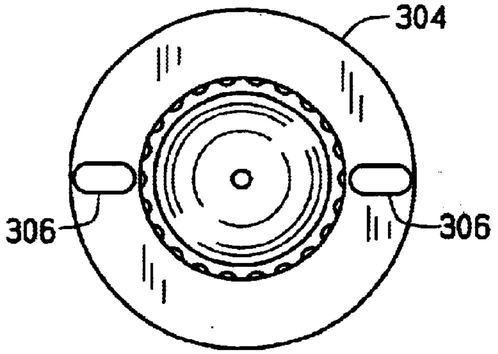
FIG. 25 is an enlarged, bottom view of the tip of FIG. 24.

Referring to FIGS. 24 and 25, the forwardly facing surface 302 of the tip flange 300 has a plurality of passageways 306 formed therein and extending inwardly from the rim 304 for conveying secondary gas therethrough. The passageways 306 are preferably configured as a pair of grooves 306 in the forwardly facing surface 302 extending radially inward from the outer rim 304 of the flange. The tip body has an exterior surface 308 in which a plurality of axial grooves 310 are formed for conveying the secondary gas. Preferably, the axial grooves 310 extend from adjacent the forwardly facing surface 302 of the flange toward the forward end of the tip body over a substantial portion of the tip body. Alternatively, one groove 310 is spirally formed in the tip body exterior surface 308 extending from adjacent the forwardly facing surface 302 toward the forward end of the tip body in a thread-like fashion. Forming grooves 210 on the exterior 208 of the tip body increases the surface area of the tip and therefore increases the level of cooling.

Figure 33:
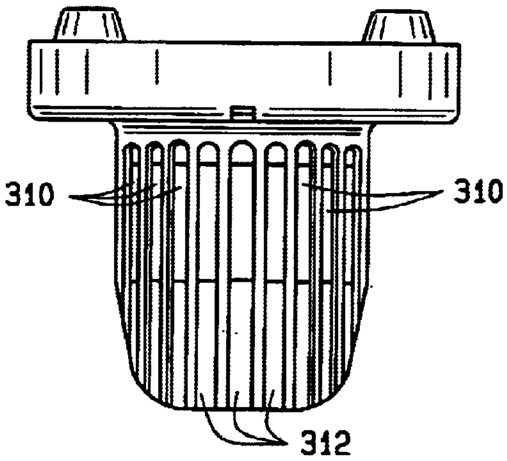
FIG. 33 is a front elevational view of the tip of FIG. 32.

A further feature of the tip assembly is shown in FIGS. 32–33 and 37–38, wherein the axial grooves 310 extending along the exterior surface of the tip body have bottoms 312 which slope inwardly toward the orifice 108 at the forward end of the tip body. It can be seen in FIGS. 32 and 37–38 that the thickness of the tip body at its forward end is less than it would otherwise be because the groove bottoms 312 slope inwardly. Consequently, the secondary gas flowing through the grooves 310 provides increased cooling at the forward end of the tip and also provides more effective containment of the plasma arc since the secondary gas is directed inwardly toward the orifice 108 to produce a shielding gas column having a reduced diameter. FIG. 33 shows axial grooves 310 which extend substantially the entire length of the tip body.

Figure 28:
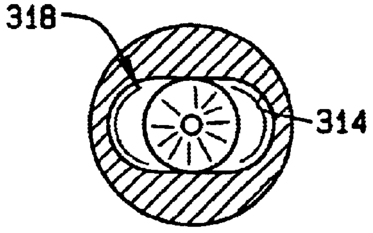
FIG. 28 is a sectional view of the tip taken along lines 28—28 of FIG. 26.

The cavity 106 of the tip 102 shown in FIGS. 23 and 26–27 is configured to receive the electrode 98 of FIGS. 3–4 in a non-contact position such that rotation of the electrode 98 relative to the tip 102 effects contact starting of the torch. As shown in FIGS. 26 and 27, the cavity is defined by an inner wall 314 which extends from the rearward end of the tip 102 to the orifice 108 at the forward end of the tip 102. Further, the inner wall 314 is configured to define a rearward chamber 316, an arcing chamber 318, and a forward chamber 320 within the cavity 106. The rearward (upper) chamber 316, which is best shown in FIG. 27, is generally cylindrical and has a generally circular cross-section. Likewise, the forward (lower) chamber 320, which is best shown in FIG. 26, is generally cylindrical and has a generally circular cross-section. By contrast, the arcing chamber 318, which is located intermediate the rearward chamber 316 and the forward chamber 320, has a non-circular cross-section taken perpendicular to the longitudinal axis of the tip. As shown in FIG. 28, the arcing chamber 318 preferably has an oblong cross-section.

Figure 27A:
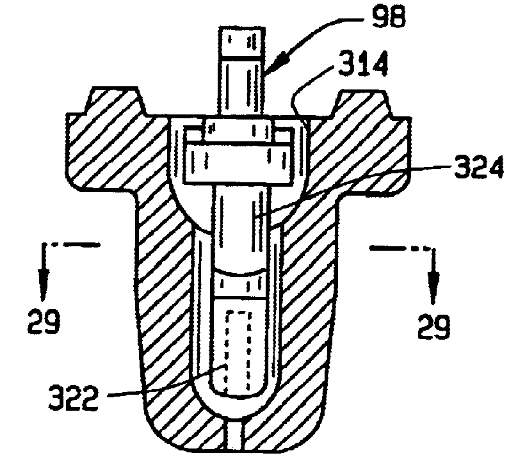
FIG. 27A is a view similar to FIG. 27 but with the electrode disposed within the tip in a non-contact position in accordance with the preferred embodiment of the rotational contact starting mechanism of the present invention.
Figure 29:
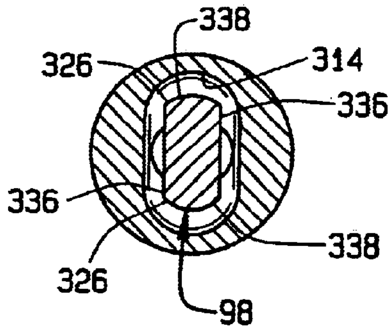
FIG. 29 is a sectional view of the tip and electrode taken along lines 29—29 of FIG. 273A with the electrode in a non-contact position.

When the tip 102 is mounted axially on the torch head 80, the electrode body 122 is received within the cavity 106 of the tip 102 in a non-contact position so that the electrode 98 does not make contact with the inner wall 314 (FIGS. 27A and 29). The generally cylindrical forward end of the electrode body 122, which houses a hafnium insert 322, is disposed within the forward chamber 320 of the cavity 106. The rearward portion of the electrode body 122 is disposed within the rearward chamber 316 of the cavity 106.

Figure 26A:
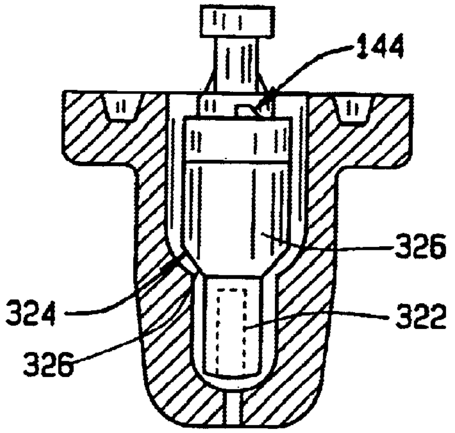
FIG. 26A is a view similar to FIG. 26 but with the electrode disposed within the tip in a non-contact position in accordance with a preferred embodiment of a rotational contact starting mechanism of the present invention.
Figure 30:
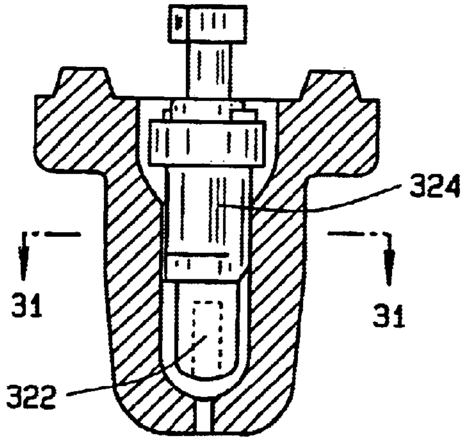
FIG. 30 is a view similar to FIG. 27A but with the electrode rotated within the tip to a contact position.
Figure 31:
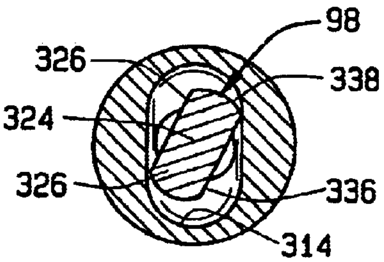
FIG. 31 is a sectional view of the tip and electrode taken along lines 31—31 of FIG. 30 with the electrode in a contact position.

The electrode 98 of FIGS. 3–4 and 12–13 also includes an arcing formation 324 as shown in FIG. 26A. The preferred arcing formation 324 comprises a pair of lateral extensions 326. When the electrode 98 is received in the cavity 106, the arcing formation 324 is disposed within the arcing chamber 318. The electrode arcing formation 324 and the portion of the inner wall 314 defining the arcing chamber 318 are configured to accommodate both the non-contact position shown in FIGS. 27A and 29 and the contact position shown in FIGS. 30 and 31.

The rotating mechanism 112 shown in FIG. 2 is adapted to effect relative rotation between the tip 102 and the electrode 98 about an axis extending longitudinally with respect to the cathode 82. A protrusion 328 on the portion of the trigger 110 inside the torch head engages a rod 330 which is rigidly coupled to the shaft of the cathode 82. A roll pin 332 (also shown in FIGS. 22–22A) is fixed to the rear insulator 88 and pivotally connected to the cathode shaft near its rearward end, and a retainer cap 334 is snapped on the cathode shaft at its rearward end. The electrode 98 is rigidly coupled with the cathode 82 and thus rotates freely with the cathode 82. The tip 102, on the other hand, remains stationary. It would also be possible to construct the torch so that the tip 102 rotates and the cathode 82 and electrode 98 remain stationary.

With reference to FIG. 2, the fully extended trigger 110 acts as a stop to prevent rearward movement of the rod 330, which is biased against forward movement. The rotating mechanism is calibrated so that the electrode 98 is received within the tip 102 in a non-contact position when the trigger 110 is fully extended. Depressing the trigger 110 causes the rod 330 to move in a forward direction and overcome the bias, thereby causing the cathode 82 and electrode 98 to rotate in a clockwise direction. This rotation brings the electrode 98 into contact with the tip 102. Continuing to depress the trigger 110 causes the protrusion 328 to disengage with the rod 330, whereby the bias causes the cathode 82 to rotate in a counterclockwise direction and causes the electrode 98 to rotate back to the non-contact position.

The inner wall 314 and the arcing formation 324 on the electrode body 122 are configured so that the relative rotation between the tip 102 and electrode 98 away from the non-contact position will bring the arcing formation 324 into contact with the portion of the inner wall 314 which defines the arcing chamber 318. FIGS. 28 and 29 show that the only contact between the tip 102 and electrode 98 is within the arcing chamber 318. This contact causes an electrical short circuit. Thereafter, relative rotation between the tip 102 and the electrode 98 back towards the non-contact position generates a pilot arc across the gap between the tip 102 and the electrode arcing formation 324.

Importantly, the electrode arcing formation 324 and the portion of the inner wall 314 defining the arcing chamber 318 both have a non-circular outline as viewed in the cross-section taken generally perpendicular to the axis of rotation. In the preferred embodiment, the non-circular outlines of the arcing chamber 318 and the arcing formation 324 on the electrode body are oblong. Moreover, the arcing formation 324 preferably comprises one or more lateral extensions 326 projecting laterally from the electrode body.

The electrode 98 also includes means for securing the electrode 98 to the cathode 82 of the torch such that the arcing formation 324 is received in the arcing chamber 318 of the tip 102 mounted on the torch. Preferably, the securing means is either the electrode locking formation 124 shown in FIGS. 8 and 9, or the locking assembly 200 shown in FIGS. 12–15A. However, for the purposes of the rotational contact starting invention, any means for securing the electrode 98 to the cathode 82 may be used.

As mentioned above, the preferred arcing formation 324 has a non-circular outline and is oblong in shape. Accordingly, the arcing formation 324 has a minor dimension across a width of the outline and a larger major dimension along a length of the outline. More specifically, the arcing formation 324 is preferably generally rectangular in shape, having a pair of flat generally parallel side surfaces 336 and a pair of end surfaces 338 (FIGS. 29 and 31) connecting the side surfaces 336. The electrode body 122 has a generally cylindric forward portion receivable in the generally cylindric forward chamber 320 of the cavity 106, and the forward portion of the electrode body 122 has a smaller diameter than the diameter of the forward chamber 320 so that the forward portion does not contact the tip 102 during relative rotation between the electrode 98 and the tip 102.

Figure 34:
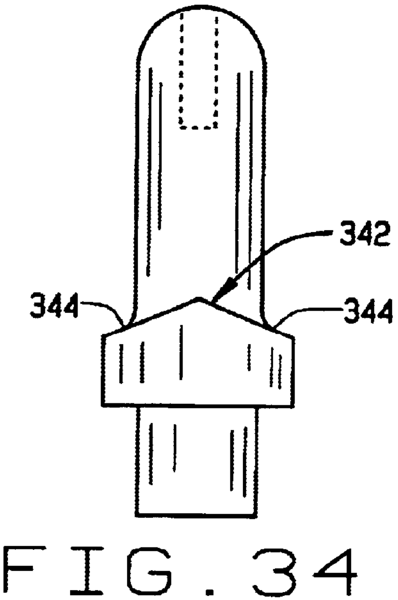
FIG. 34 is a front elevational view of an electrode in accordance with an alternative embodiment of the rotational contact starting mechanism of the present invention.
Figure 35:
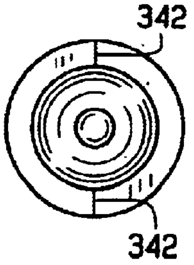
FIG. 35 is a top view of the electrode of FIG. 34.
Figure 36:
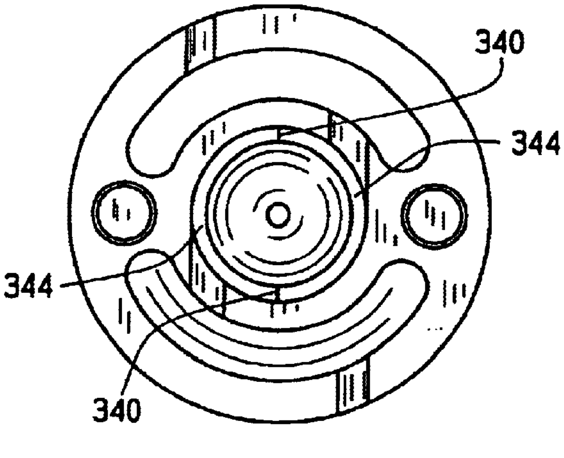
FIG. 36 is a top view of a tip for use with the electrode of FIG. 34 in accordance with an alternative embodiment of a rotational contact starting mechanism.
Figure 37:
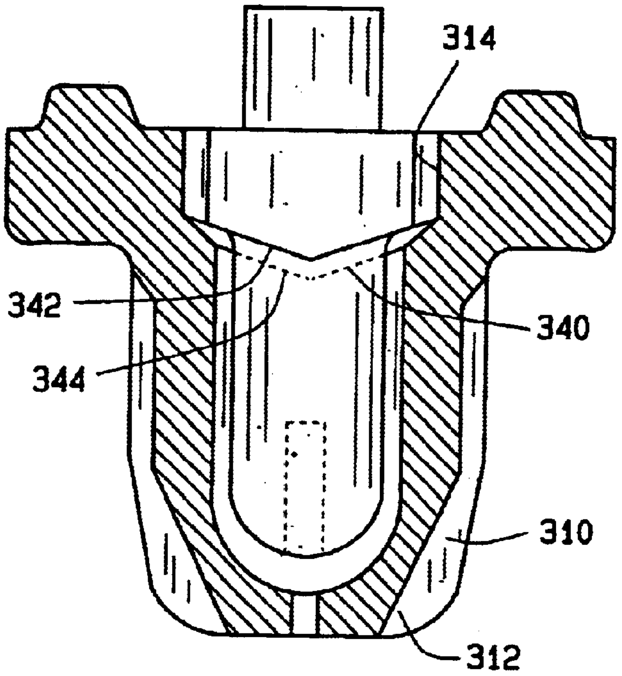
FIG. 37 is a sectional view of the tip of FIG. 36 but with broken lines showing a hidden portion of the inner wall of the tip and with the electrode disposed within the tip in a non-contact position.
Figure 38:
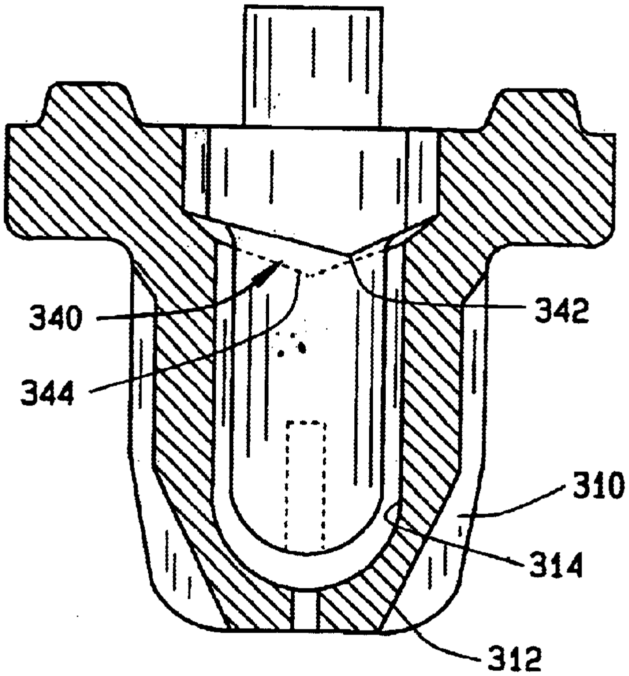
FIG. 38 is a view similar to FIG. 37 but with the electrode rotated within the tip to a contact position.

Referring next to FIGS. 34–38, an alternative construction of the rotational contact starting mechanism is shown. In this embodiment, the inner wall 314 of the tip cavity 106 includes one or more rearwardly facing axial projections 340 (FIG. 36) and the electrode arcing formation 324 includes one or more forwardly facing axial projections 342 (FIGS. 34–35). These axial projections 340, 342 are configured so that the body of the electrode 98 may be received in the tip cavity 106 in a non-contact position (FIG. 37) and relative rotation between the tip 102 and the electrode 98 away from the non-contact position brings the axial projections 342 on the electrode 98 into contact (FIG. 38) with the axial projections 340 on the tip 102. Preferably, the axial projections 340, 342 on both the electrode 98 and the tip 102 are annular formations which comprise one or more inclined ramps 344. The embodiment of FIGS. 34–38 shows axial projections 340, 342 having two ramps 344, although other embodiments employing a different number of ramps 344 are contemplated.

Figure 39:
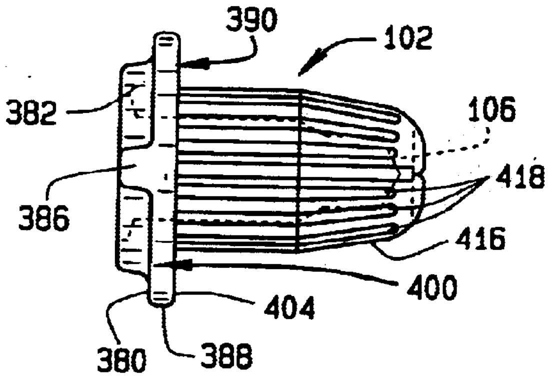
FIG. 39 is an enlarged, side view of an alternate embodiment of the metering tip shown in FIG. 2.
Figure 40:
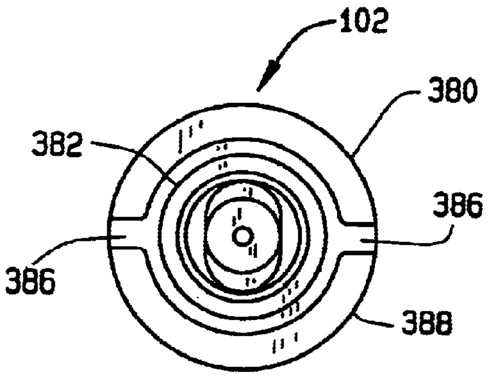
FIG. 40 is an enlarged bottom view of the tip shown in FIG. 39.

FIGS. 39–42 illustrate an alternate embodiment of the torch tip 102. The cavity 106 and rotational start functionality and features of the tip 102 in this alternate embodiment, are described above in reference to FIGS. 23–31 and 33–38. With reference to FIGS. 39 and 40, the tip 102 has a rearwardly facing surface 380 adapted for sealing engagement with a forwardly facing surface on the torch head. A annular raised rib 382 is located on the rearwardly facing surface 380. Extending radially from rib 382 are a pair registration ribs 386 that are engageable with the torch head to hold the tip 102 in a predetermined fixed angular position relative thereto. The registration ribs 386 are positioned opposite one another and extend radially from the annular raised rib 382 to an outer rim 388 of a peripheral flange 390 located at the rearward end of the tip 102. The peripheral flange 390 projects generally radially outwardly with respect to the central longitudinal axis of the tip 102. The registration ribs 386 are received in corresponding registration slots 392 in the forwardly facing surface of a center insulator 394 inside the torch head 80. A shield cup 396 screws onto the torch head and supports a sealing engagement between the tip 102 and the torch head 80. The registration ribs 386 rotationally orient the tip 102 on the torch head 80 such that when the torch is in a non-starting operational mode, the electrode and the inner wall 314 (FIG. 26) of cavity 106 are in a non-contact relationship.

Figure 42:
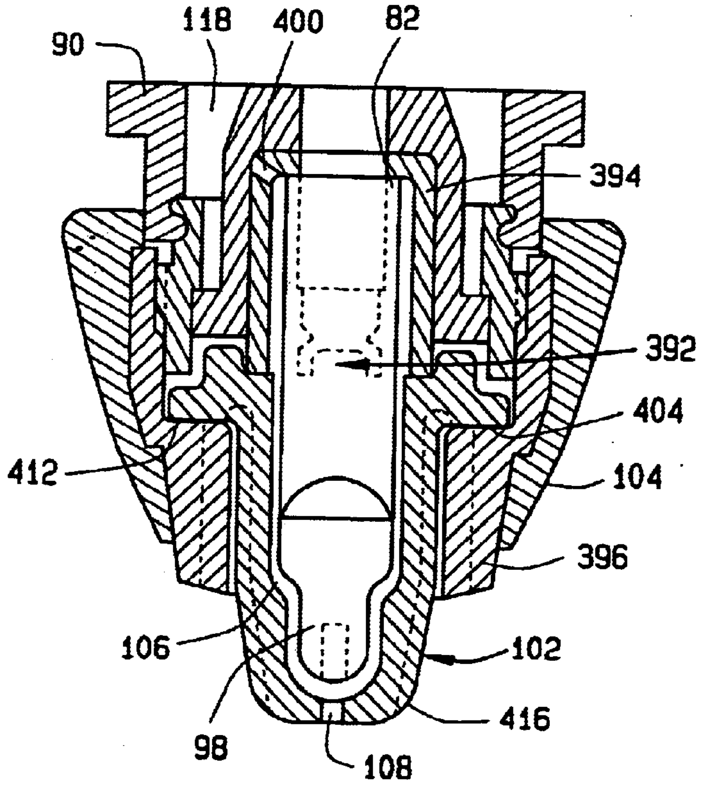
FIG. 42 is a sectional view of the torch head shown in FIG. 2 incorporating the tip shown in FIG. 39.

Referring to FIG. 42, when the tip 102 is in sealing engagement with the torch head 80, an annular area of the rearwardly facing surface 380 radially inward from the annular raised rib 382 is in sealing engagement with the center insulator 394. Gas flows through the torch head 80 a portion of gas flows through an orifice 400 in center insulator 394 and is used as plasma gas. The plasma gas passes along the outer surface of the cathode 82 and enters the cavity 106 of tip 102. The plasma gas flows generally tangentially with respect to the cavity 106 of the tip. The portion of gas that flows through the torch head 80 but does not flow through orifice 400 is secondary gas. The secondary gas flows along the outside of center insulator 394 and along the annular raised rib 382. As described above, there is a sealing engagement between the area of the rearwardly facing surface 380 that is radially inward from the annular raised rib 382 and the center insulator 394, therefore, the secondary gas is forced to flow along the area of the rearwardly facing surface 380 that is radially outward from the annular raised rib 382, and then around the peripheral flange 390 between the outer rim 388 and the shield cup 396.

Figure 41:
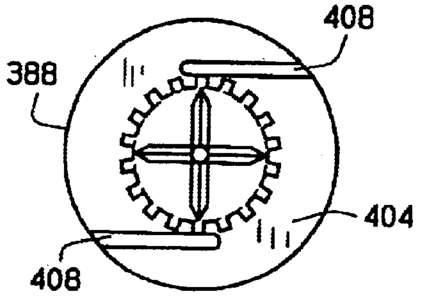
FIG. 41 is an enlarged top view of the tip shown in FIG. 39.

Referring to FIG. 39 and 41, the peripheral flange 390 includes a forwardly facing surface 404 that includes a plurality of passageways 408 formed therein and extending inwardly from the outer rim 388 for conveying secondary gas therethrough. As shown in FIG. 42, when the shield cup 396 is screwed in place on the torch head 80, an interior surface 412 engaged with the forwardly facing surface 404 of the peripheral flange 390. As the secondary gas flows between the outer rim 388 and the shield cup 396, the passageways 408 provide a gas flow path to an exterior surface 416 of tip 102.

Referring to FIG. 39, the tip body exterior surface 416 includes a plurality of axial grooves 418 that are formed for conveying the secondary gas. Preferably, the axial grooves 310 extend from adjacent the forwardly facing surface 404 of the peripheral flange 390 toward the forward end of the tip body over a substantial portion of the tip body. Alternatively, one groove 418 is spirally formed in the tip body exterior surface 416 extending from adjacent the forwardly facing surface 404 toward the forward end of the tip body in a thread-like fashion. Forming grooves 418 on the exterior surface 416 of the tip body increases the surface area of the tip and therefore increases the level of cooling.

In use, the plasma torch shown in FIG. 2 cuts or welds a metal workpiece by directing a plasma consisting of ionized gas particles toward the workpiece. With the cutting system power and the gas supply both turned on, the torch is started by depressing the trigger 110, which transfers the motion of the trigger to the rod 330 within the torch head 80, which is biased against movement. The motion of the rod 330 imparts a rotational force on the cathode 82. The cathode 82 and electrode 98, which are locked together, both rotate with respect to the stationary tip 102. This rotation causes the arcing formation 324 on the electrode 98 to contact the inner wall 314 of the tip 102 within the arcing chamber 318, thus creating an electrical short circuit. Continuing to depress the trigger 110 then causes trigger 110 to disengage with the rod 330, whereby the bias causes the cathode 82 to rotate in the opposite direction. Consequently, the electrode arcing formation 324 moves away from the inner wall 314 of the tip 102 thereby creating a gap between the tip 102 and the electrode 98 for establishing a pilot arc therebetween.

Figure 32A:
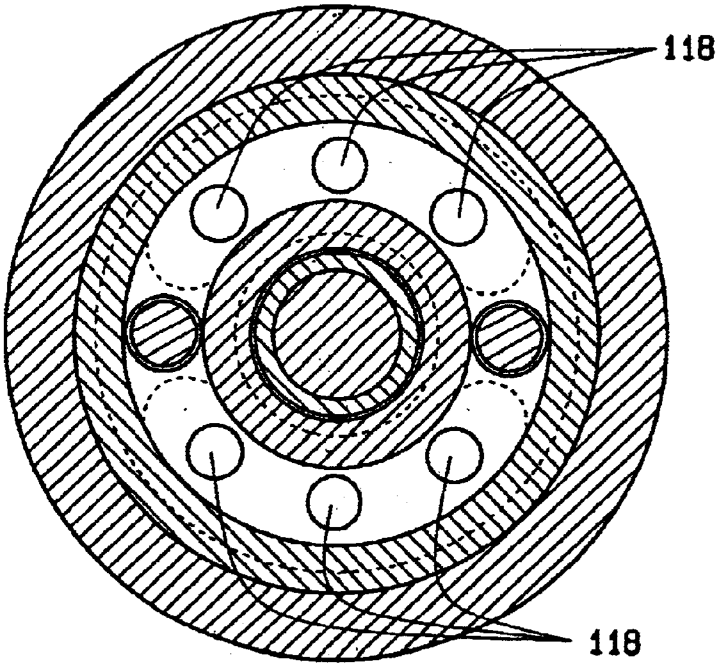
FIG. 32A is a sectional view of the forward end of the torch taken along lines 32A—32A of FIG. 32.

The supply of gas (e.g., air or nitrogen) to the torch head 80 is directed into the air chamber 96 between the insulators 88, 90 through the hose connector 114 disposed in the first bore 116 of the rear insulator 88. The gas circulates through the air chamber 96 and passes through one of a plurality of apertures 118 (FIG. 32A) in the front insulator 90. Then, the gas is directed into the tip 102, which divides the volume of gas into a volume of plasma gas flow and a volume of secondary gas flow. The plasma gas advances into the cavity 106 of the tip 102 and the secondary gas travels to the outer perimeter of the tip body.

The pilot arc established within the arcing chamber 318 heats the swirling flow of plasma gas passing between the electrode 98 and tip 102 and causes it to ionize. Then, the ionized gas in the gap is blown out of the torch through the orifice 108 and appears as a flame extending from the tip 102. At this point, the plasma arc extends through the orifice 108 from the hafnium insert 322 to the exterior of the tip 102. When the torch head 80 is brought within a sufficiently close distance to a workpiece, the arc transfers between the hafnium insert 322 and the workpiece because the impedance of the workpiece to ground is lower than the impedance of the torch tip 102 to the ground.

The secondary gas at the outer perimeter of the tip body flows between the peripheral flange 300 and the tip retainer 104. The secondary gas passes along the axial groove(s) 310 formed in the exterior surface of the tip body. After cooling the tip 102 by passing through the groove(s) 310, the flow of secondary gas surrounds the tip orifice 105 to contain the arc and to cool the workpiece.

A variety of materials can be used for the parts of the torch. In the preferred embodiment, the electrode 98 and tip 102 are made of copper, the anode 92 is made of brass, the cathode 82 is made of stainless steel, and the tube spacer 86 is made of aluminum. Other materials which are highly conductive could also be used for these parts, although dissimilar metals should be avoided. By contrast, materials having a low conductivity (e.g., plastics or ceramics) should be used for the front and rear insulators 88, 90 and for the tip retainer 104. Preferably, the front insulator 90 is made of high temperature plastic such as Vespel® and the rear insulator 88 and tip retainer 104 are made of plastic. For any of the parts of the torch, the relative cost, weight, and durability of the material should also be considered.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. A consumable electrode adapted for locking engagement in a fixed axial and rotational position relative to a cathode, said electrode comprising:

an electrode body at a forward end of said electrode, the electrode body having a central longitudinal axis;

a tail stock projecting axially rearwardly from said electrode body; and a cam-like contact formation disposed on said tail stock, said cam-like contact formation engageable with a cathode contact formation such that rotation of said electrode and the cathode relative to one another causes said electrode to be in locking engagement with the cathode.

2. The electrode of claim 1 wherein said tail stock comprises a groove having a first end, a second end, and a diminishing depth such that said depth progressively lessens from said first end to said second end.

3. The electrode of claim 2 wherein said groove further comprises a rearward edge and a forward edge which define a width of said groove such that said width of said groove at said first end is greater than said width of said groove at said second end.

4. The electrode of claim 3 wherein said rearward edge is configured to incline toward a forward end of said tail stock as said rearward edge extends from said first end to said second end.

5. The electrode of claim 4 wherein the cathode contact formation is a detent in a recess in the cathode, and wherein said tail stock further comprises a flat surface extending longitudinally rearward along said tail stock from said first end of said groove to a rearward end of said tail stock, said flat surface configured to allow said tail stock to be inserted in the cathode recess such that said first end engages with the cathode contact formation.

6. The electrode of claim 5 wherein said cam-like contact formation comprises said rearward edge of said groove, and wherein the rotation of the electrode and cathode relative to one another causes the cathode contact formation to engage said electrode contact formation, thereby creating a longitudinal force that places an annular shoulder of said electrode body in frictional locking engagement with a leading edge of the cathode.

7. The electrode of claim 6 wherein the rotation of the electrode and cathode relative to one another further causes the detent to engage said groove such that the diminishing depth of said groove creates an increasing horizontal force on said tail stock, thereby placing said tail stock in locking engagement with a side wall of the cathode recess.

8. The electrode of claim 1 wherein said electrode further comprises a threadless locking formation disposed on said tail stock, said electrode locking formation engageable with a cathode locking formation such that said rotation of the electrode and cathode relative to one another causes said electrode locking formation to move into locking engagement with the cathode locking formation.

9. The electrode of claim 8 wherein said cam-like contact formation comprises a plurality of rearwardly facing protrusions spaced at intervals around said electrode body.

10. The electrode of claim 9 wherein each of said rearwardly facing protrusions are engageable with a corresponding inclined forwardly facing ramp on the cathode.

11. The electrode of claim 8 wherein said cam-like contact formation comprises at least one inclined rearwardly facing ramp adapted to engage mating ramps on the cathode.

12. The electrode of claim 8 wherein said locking formation is configured to be disposed on a rearward end of said tail stock.

13. The electrode of claim 12 wherein the locking formation comprises an elongated head on said tail stock extending generally transversely with respect to said central axis.

14. The electrode of claim 8 further comprising a centering formation projecting axially rearwardly from said electrode body, said centering formation comprising a substantially annular shoulder adapted to be received within a recess at a forward end of the cathode.

15. A torch adapted for receiving a consumable electrode, said torch comprising:

a torch body having a central longitudinal axis, a rearward end, and a forward end; and a cathode mounted axially on the torch toward the forward end of the torch body, said cathode comprising a locking formation engageable by a locking formation of the electrode, and a cam-like contact formation engageable by a contact formation of the electrode;

said cathode cam-like contact formation being configured so that relative rotation between the electrode and cathode causes the electrode to move in an axial direction relative to the cathode thereby locking the electrode in fixed axial and rotational position relative to the cathode.

16. The torch of claim 15 wherein said cathode comprises a recess in a forward end thereof extending axially rearwardly with respect to the torch body for receiving a rearward portion of the electrode.

17. The torch of claim 16 wherein said cam-like contact formation comprises a detent inside said recess.

18. The torch of claim 16 wherein said locking formation comprised a detent inside said recess.

19. The torch of claim 16 wherein said cathode locking formation divides the recess into a forward chamber and a rearward chamber.

20. The torch of claim 19 wherein the cathode locking formation defines a slot sized to permit passage of the rearward portion of the electrode from the forward chamber through the slot into the rearward chamber.

21. The torch of claim 15 wherein said cam-like contact formation comprises a plurality of forwardly facing arcuate ramps spaced at intervals around the cathode.

* * * * *